US012626417B2

(12) United States Patent

Guo et al.

(10) Patent No.: US 12,626,417 B2

(45) Date of Patent: May 12, 2026

(54) BLOCKCHAIN-BASED DATA PROCESSING METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Rui Guo, Shenzhen (CN); Hu Lan, Shenzhen (CN); Zongyou Wang, Shenzhen (CN); Jun Liang, Shenzhen (CN); Yang Lu, Shenzhen (CN); Chaojie Qi, Shenzhen (CN); Shitao Xu, Shenzhen (CN); Yang Mo, Shenzhen (CN); Yifang Shi, Shenzhen (CN); Gengliang Zhu, Shenzhen (CN); Lisen Li, Shenzhen (CN); Yubin Song, Shenzhen (CN); Chao Wang, Shenzhen (CN); Ming Liu, Shenzhen (CN); Yongjing Li, Shenzhen (CN); Hui Zhang, Shenzhen (CN); Zimin Chen, Shenzhen (CN); Zuodong Liang, Shenzhen (CN); Bo Qin, Shenzhen (CN); Tao Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 311 days.

(21) Appl. No.: 18/212,100

(22) Filed: Jun. 20, 2023

(65) Prior Publication Data

US 2023/0334726 A1     Oct. 19, 2023

Related U.S. Application Data

(63) Continuation of application No. PCT/CN2022/130318, filed on Nov. 7, 2022.

(30) Foreign Application Priority Data

Jan. 30, 2022    (CN) .......................... 202210114521.4

(51) Int. Cl.
*G06T 11/00* (2026.01)
*G06F 3/0482* (2013.01)
(Continued)

(52) U.S. Cl.
CPC ............ *G06T 11/00* (2013.01); *G06F 3/0482* (2013.01); *G06Q 20/389* (2013.01); *G06T 7/11* (2017.01);
(Continued)

(58) Field of Classification Search
CPC ....... G06T 11/00; G06T 7/11; G06T 2200/24; G06T 2210/61; G06F 3/0482;
(Continued)

(56) References Cited

U.S. PATENT DOCUMENTS 11,170,582 B1    11/2021    McNeil et al.
11,895,371 B1 *    2/2024    Aggarwal .......... H04N 21/8545
(Continued)

FOREIGN PATENT DOCUMENTS

CN        110011785 A      7/2019
CN        110401707 A      11/2019
(Continued)

OTHER PUBLICATIONS

Tencent Technology (Shenzhen) Company Limited, ISR, PCT/CN2022/130318, Jan. 17, 2023, 3 pgs.

*Primary Examiner* — Xiao M Wu
*Assistant Examiner* — Latrell Anthony Creary
(74) *Attorney, Agent, or Firm* — Morgan, Lewis & Bockius LLP

(57) ABSTRACT

This application discloses a blockchain-based data processing method performed by a computer device. The method
(Continued)

includes: in response to a selection operation of media elements associated with a target object, acquiring a target media element combination based on the selected media elements; in response to a virtual resource creation operation for the target media element combination, generating target combined media data corresponding to the target media element combination; and transmitting a virtual resource creation request for the target combined media data to a blockchain network, wherein the blockchain network creates a target on-chain virtual resource corresponding to the target combined media data after determining that the target combined media data passes duplicate check and verification, and an ownership right of the target on-chain virtual resource belonging to the target object.

20 Claims, 12 Drawing Sheets

(51) Int. Cl.

| | | |
|---|---|---|
| *G06Q 20/38* | (2012.01) | |
| *G06T 7/11* | (2017.01) | |

(52) U.S. Cl.
CPC ...... *G06T 2200/24* (2013.01); *G06T 2210/61* (2013.01)

(58) Field of Classification Search
CPC .. G06F 21/64; G06F 16/215; G06F 16/24573; G06F 16/27; G06Q 20/389; H04L 9/50; H04N 21/2541; H04N 21/472; Y02D 10/00
See application file for complete search history.

(56) References Cited

U.S. PATENT DOCUMENTS

| | | | | |
|---|---|---|---|---|
| 2023/0318856 A1* | 10/2023 | Seki | ................... | G06Q 20/3678 713/189 |
| 2025/0104051 A1* | 3/2025 | English | .............. | G06Q 20/3678 |

FOREIGN PATENT DOCUMENTS

| | | |
|---|---|---|
| CN | 111708966 A | 9/2020 |
| CN | 113127571 A | 7/2021 |
| CN | 113822974 A | 12/2021 |
| WO | WO 2019217367 A2 | 11/2019 |

* cited by examiner

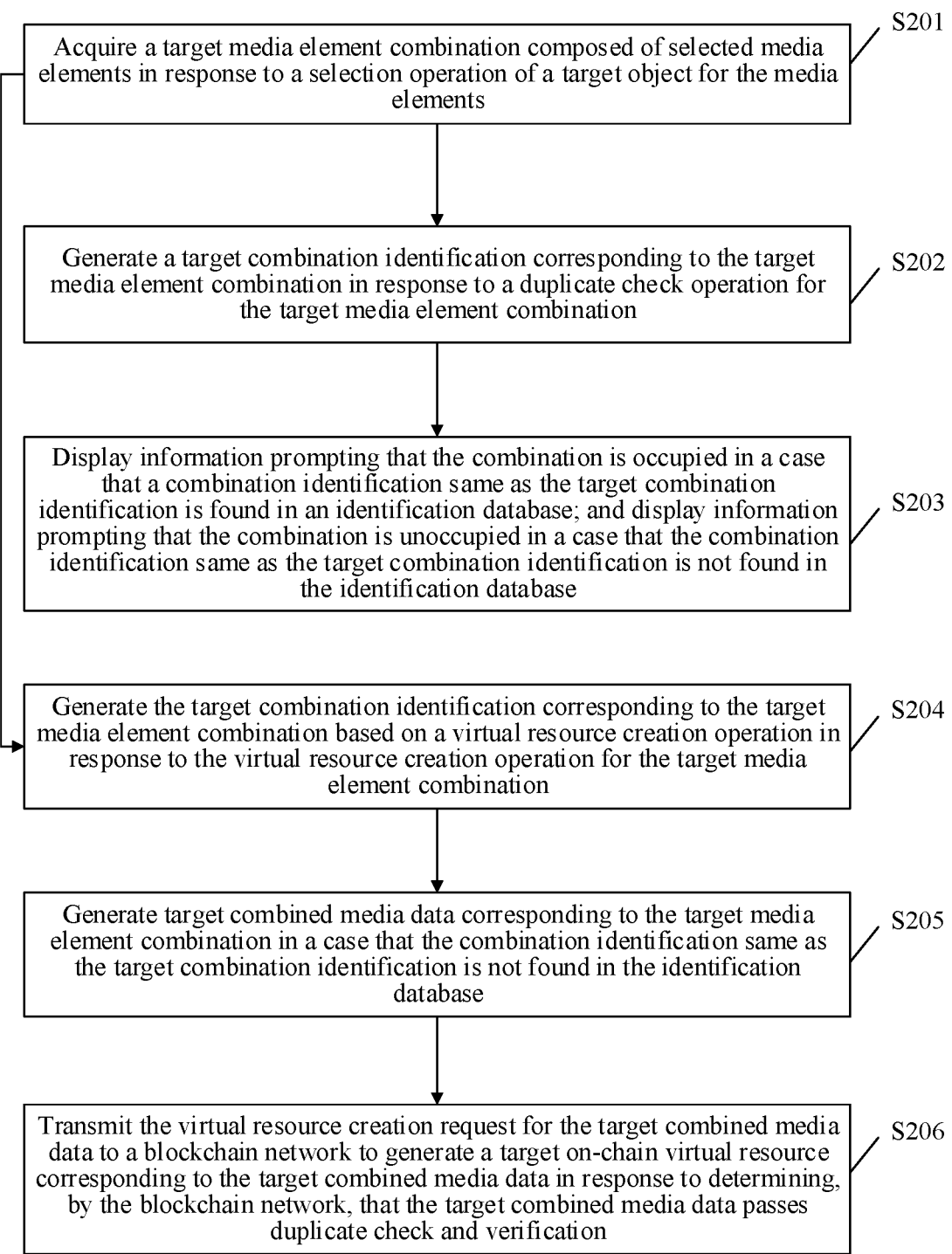

Acquire a target media element combination composed of selected media elements in response to a selection operation of a target object for the media elements — S201

Generate a target combination identification corresponding to the target media element combination in response to a duplicate check operation for the target media element combination — S202

Display information prompting that the combination is occupied in a case that a combination identification same as the target combination identification is found in an identification database; and display information prompting that the combination is unoccupied in a case that the combination identification same as the target combination identification is not found in the identification database — S203

Generate the target combination identification corresponding to the target media element combination based on a virtual resource creation operation in response to the virtual resource creation operation for the target media element combination — S204

Generate target combined media data corresponding to the target media element combination in a case that the combination identification same as the target combination identification is not found in the identification database — S205

Transmit the virtual resource creation request for the target combined media data to a blockchain network to generate a target on-chain virtual resource corresponding to the target combined media data in response to determining, by the blockchain network, that the target combined media data passes duplicate check and verification — S206

FIG. 5

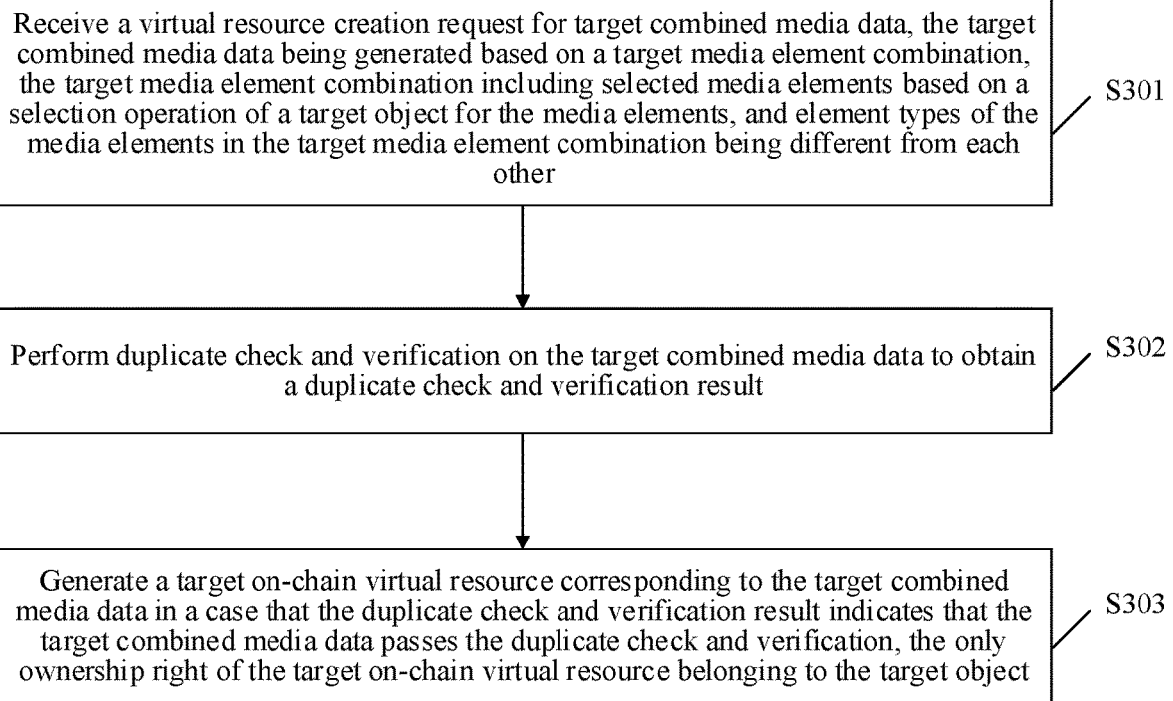

Receive a virtual resource creation request for target combined media data, the target combined media data being generated based on a target media element combination, the target media element combination including selected media elements based on a selection operation of a target object for the media elements, and element types of the media elements in the target media element combination being different from each other ⟋ S301

Perform duplicate check and verification on the target combined media data to obtain a duplicate check and verification result ⟋ S302

Generate a target on-chain virtual resource corresponding to the target combined media data in a case that the duplicate check and verification result indicates that the target combined media data passes the duplicate check and verification, the only ownership right of the target on-chain virtual resource belonging to the target object ⟋ S303

FIG. 6

BLOCKCHAIN-BASED DATA PROCESSING METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/130318, entitled "BLOCKCHAIN-BASED DATA PROCESSING METHOD AND APPARATUS, DEVICE, STORAGE MEDIUM, AND PROGRAM PRODUCT" filed on Nov. 7, 2022, which claims priority to Chinese Patent Application No. 202210114521.4, entitled "BLOCKCHAIN-BASED DATA PROCESSING METHOD AND APPARATUS, DEVICE, STORAGE MEDIUM, AND PROGRAM PRODUCT" filed on Jan. 30, 2022, all of which is incorporated by reference in its entirety.

FIELD OF THE TECHNOLOGY

This application relates to the field of computer technology, and in particular, to a blockchain-based data processing method and apparatus, a device, a storage medium, and a program product.

BACKGROUND OF THE DISCLOSURE

An off-chain digital product may only be bound with the sole on-chain virtual resource in a blockchain network, and the on-chain virtual resource may represent the ownership right of the off-chain digital product stored on the chain. That is to say, when a common object has the only ownership right of the on-chain virtual resource, it is proved that the off-chain digital product belongs to the user. The off-chain digital product may include media data that can be bound with the on-chain virtual resource, such as pictures, videos, music, and games.

In the blockchain network described in the related art, a resource platform party usually generates the on-chain virtual resource based on the existing off-chain digital product. Then a common object acquires the on-chain virtual resource generated by the resource platform party, and then acquires the corresponding off-chain digital product. The generated on-chain virtual resource cannot be changed or deleted. If the on-chain virtual resource is not acquired by the common object, the waste of the on-chain virtual resources can be generated, and the utilization rate of the on-chain virtual resource on the blockchain can be low. Therefore, the resource platform party usually only selects a limited number of off-chain digital products to generate off-chain virtual resources. It results in few presentation styles of the off-chain digital products which can be selected by the common object and fail to meet the requirements of the common object.

SUMMARY

The embodiments of this application provide a blockchain-based data processing method and apparatus, a device, and a readable storage medium. As such, the waste of the on-chain virtual resource can be reduced and the utilization rate of the on-chain virtual resource on the blockchain can be improved.

The embodiments of this application provide a blockchain-based data processing method performed by a computer device, including:

in response to a selection operation of media elements associated with a target object, acquiring a target media element combination based on the selected media elements;

in response to a virtual resource creation operation for the target media element combination, generating target combined media data corresponding to the target media element combination; and transmitting a virtual resource creation request for the target combined media data to a blockchain network, wherein the blockchain network creates a target on-chain virtual resource corresponding to the target combined media data after determining that the target combined media data passes duplicate check and verification, and an ownership right of the target on-chain virtual resource belonging to the target object.

The embodiments of this application provide a computer device, including a processor, a memory, and a network interface, the processor being separately connected to the memory and the network interface, the network interface being configured to provide a data communication network element, the memory being configured to store a computer program that, when executed by the processor, causes the computer device to perform the blockchain-based data processing method provided in the embodiments of this application.

The embodiments of this application provide a non-transitory computer-readable storage medium, storing a computer program therein, the computer program being loaded and executed by a processor of a computer device and causing the computer device to perform the blockchain-based data processing method provided in the embodiments of this application.

The embodiments of this application have the following beneficial effects.

In the embodiments of this application, a target media element combination composed of selected media elements may be acquired in response to a selection operation of a target object for the media elements. Then target combined media data corresponding to the target media element combination may be generated in response to a virtual resource creation operation for the target media element combination. Next, a virtual resource creation request for the target combined media data may be transmitted to a blockchain network. A target on-chain virtual resource corresponding to the target combined media data may be created in response to determining, by the blockchain network, that the target combined media data passes duplicate check and verification, an ownership right of the target on-chain virtual resource belonging to the target object. Element types of the media elements in the target media element combination are different from each other. Thus, even if a small number of element types and a small number of media elements under each element type are provided, a large number of media element combinations can be obtained, and different media element combinations have different presentation styles, greatly increasing the presentation styles of the off-chain digital product. The target object can select the target media element combination based on his own requirements, and then apply to the blockchain network to generate the on-chain virtual resource corresponding to the target media element combination. As such, the ownership right of the on-chain virtual resource belongs to the target object, the on-chain virtual resource on the blockchain is used fully, the utilization rate of the on-chain virtual resource on the blockchain is improved, and the waste of the on-chain virtual resource is avoided.

BRIEF DESCRIPTION OF THE DRAWINGS

FIG. 5 is a flowchart of a blockchain-based data processing method provided in an embodiment of this application.

FIG. 6 is a flowchart of a blockchain-based data processing method provided in an embodiment of this application.

DESCRIPTION OF EMBODIMENTS

In conjunction with the drawings in the embodiments of this application, the technical solutions of the embodiments of this application will be clearly and completely described below. It is apparent that the embodiments described are only some, but not all embodiments of this application. Other embodiments can be obtained by those skilled in the art based on the embodiments of this application without creative work, which fall within the scope of protection of this application.

Figure 1:
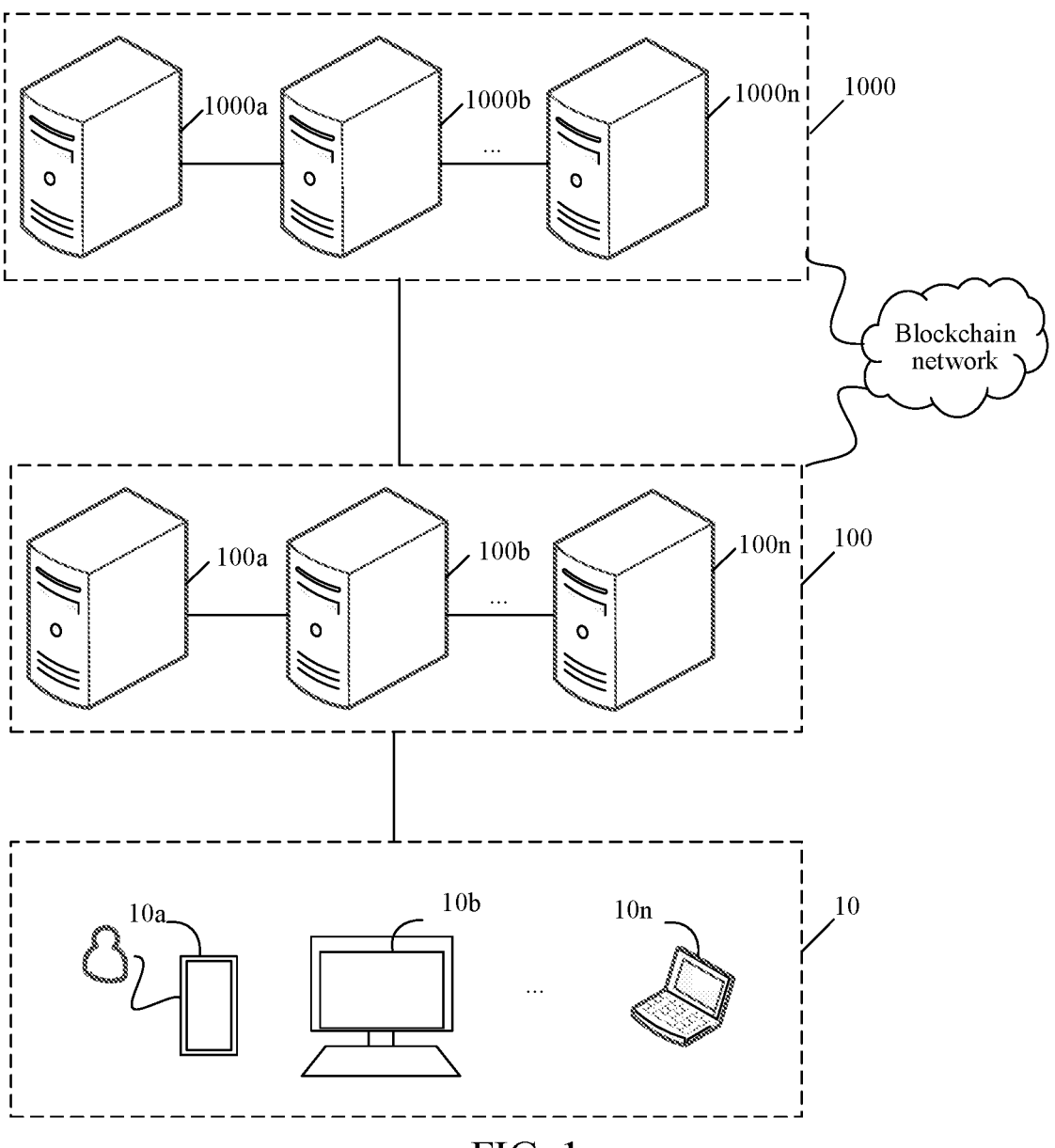
FIG. 1 is a schematic illustration of a network architecture provided in an embodiment of this application.

Reference may be made to FIG. 1. FIG. 1 is a schematic illustration of a network architecture provided in an embodiment of this application. Blockchain is a new application mode of the computer technology, such as distributed data storage, point-to-point transmission, consensus mechanism, and encryption algorithm. The blockchain is mainly used to sort data based on the time order and encrypt the data into a ledger. As such, the data cannot be tampered and forged, and at the same time, the data can be verified, stored, and updated. The blockchain is essentially a decentralized database. Each node in the database stores one same blockchain, and the blockchain network can distinguish the nodes into consensus nodes and service nodes. The consensus nodes are responsible for the consensus of the whole network of the blockchain. The process of writing the transaction data into the ledger in the blockchain network may include: the client transmits the transaction data to the service node; the transaction data is transmitted between the service nodes in the blockchain network in a relay baton way until the consensus node receives the transaction data; the consensus node packages the transaction data into a block and performs consensus with other consensus nodes; after the consensus is approved, the block carrying the transaction data is written into the ledger.

It can be understood that the block is a data packet carrying the transaction data (namely, the transaction service) on the blockchain network. Besides, it is a data structure marked with a time stamp and a hash value of a previous block. The block is verified by the consensus mechanism of the network and determines the transactions in the block.

It can be understood that a hash value, also referred to as an information feature value or a feature value, is generated by converting input data with an arbitrary length into a password by a hash algorithm and performing a fixed output. The original input data cannot be retrieved by decrypting the hash value, and it is the one-way encryption function. In the blockchain, each block (except the initial block) includes the hash value of the previous block, which is referred to as the parent block of the current block. The hash value is a potential core foundation and the most important aspect in the blockchain technology. It preserves the integrity of the blockchain as a whole and the authenticity of the recorded and viewed data.

It can be understood that the blockchain system can include a smart contract. In the blockchain system, the smart contract can be understood as a kind of code which can be understood and executed by each node (including the consensus node) of the blockchain. In addition, the smart contract can execute any logic and obtain a result. A user can recall a smart contract already deployed on the blockchain by initiating a transaction service request by the client. Then the service node on the blockchain can transmit the transaction service request to the consensus node, and each consensus node on the blockchain can separately run the smart contract. It is understood that the blockchain may include one or more smart contracts that can be distinguished by an identity document (ID) or name. The transaction service request initiated by the client may also carry the ID or name of the smart contract to specify a smart contract that the blockchain needs to run. If the smart contract specified by the client is a contract needing to read data, each consensus node will access a local ledger to read the data, and finally each consensus node will mutually verify whether the execution results are consistent (namely, performing consensus). If the execution results are consistent, the execution results can be stored in their respective local ledgers and returned to the client.

As shown in FIG. 1, the network architecture may include a consensus node cluster 1000, a service node cluster 100, and a terminal device (client) cluster 10. The consensus node cluster 1000 may include at least two consensus nodes, and the service node cluster 100 may include at least two service nodes. As shown in FIG. 1, the consensus node cluster 1000 may include a consensus node 1000a, a consensus node 1000b . . . a consensus node 1000n. The service node cluster 100 may specifically include a service node 100a, a service node 100b . . . a service node 100n. The terminal device cluster 10 may specifically include a terminal device 10a, a terminal device 10b . . . a terminal device 10n.

As shown in FIG. 1, the terminal device 10a, the terminal device 10b . . . the terminal device 10n may perform data connection with the service node 100a, the service node 100b . . . the service node 100n, respectively. As such, the terminal device may perform data interaction with the service node by the data connection. The service node 100a, the service node 100b . . . the service node 100n may perform the data connection with the consensus node 1000a, the consensus node 1000b . . . the consensus node 1000n, respectively. As such, the service node may perform the data interaction with the consensus node by the data connection. The service node 100a, the service node 100b . . . the service node 100n are connected to each other so that the data interaction may be performed between the service nodes, and the consensus node 1000a, the consensus node 1000b . . . the consensus node 1000n are connected to each other so that the data interaction may be performed between the consensus nodes.

It can be understood that the consensus node cluster 1000 and the service node cluster 100 together form the blockchain network. Each consensus node in the consensus node cluster 1000 and each service node in the service node cluster 100 store one same blockchain. In the blockchain, before a block is uplinked, the block needs to pass through the consensus node cluster 1000 in the blockchain network for performing consensus. The block can be added to the blockchain after the consensus is approved. Although the service node cluster 100 does not participate in the consensus of the block, it helps to disseminate the block and vote information, mutually synchronize states, and the like. In addition, each consensus node in the consensus node cluster 1000 and each service node in the service node cluster 100 may be referred to as blockchain nodes.

It can be understood that transactions or block transmission can be performed between the blockchain nodes via the data connection described above. The blockchain network can realize the data connection between the blockchain nodes based on the node identifications. Each blockchain node in the blockchain network has a corresponding node identification, and each of the above blockchain nodes can store the node identifications of other blockchain nodes having a connection relationship with itself. As such, the acquired data or the generated block is subsequently broadcasted to other blockchain nodes based on the node identifications of other blockchain nodes. For example, the service node 100a may maintain a node identification list as shown in Table 1. The node identification list stores the node names and the node identifications of other blockchain nodes.

TABLE 1

| Node name | Node identification |
|---|---|
| Service node 100a | 117.114.151.174 |
| Consensus node 1000a | 117.116.189.145 |
| Service node 100b | 117.114.151.183 |
| Consensus node 1000b | 117.117.125.169 |
| . . . | . . . |
| Consensus node 1000n | 117.116.189.125 |

The node identification can be an Internet Protocol (IP) address and any other information which can be used for identifying the blockchain nodes in the blockchain network, and Table 1 only takes the IP address as an example for explanation. For example, the service node 100a may transmit information (e.g., transaction data) to the consensus node 1000a by the node identification 117.116.189.145, and the consensus node 1000a may determine that the information is sent by the service node 100a by the node identification 117.114.151.174.

It can be understood that the above data connection is not limited to a connection way, may be directly or indirectly connected by a wired communication way, may be directly or indirectly connected by a wireless communication way, or may be connected by other connection ways, which is not limited in this application.

It can be understood that the blockchain-based data processing method provided in the embodiments of this application may be performed by a computer device, including but not limited to the above terminal device, blockchain nodes (which may be a terminal or a server). The above server may be an independent physical server, may be a server cluster or a distributed system of a plurality of the physical servers, or may be a cloud server providing basic cloud computing services, such as cloud service, cloud database, cloud computing, cloud function, cloud storage, network service, cloud communication, middleware service, domain name service, security service, content delivery network (CDN), and big data and artificial intelligence (AI) platforms. The above terminal may be, but not limited to, a smart phone, a tablet computer, a notebook computer, a desktop computer, a smart speaker, a smart watch, and a car terminal.

It can be understood that the embodiments of this application may be applied to various scenarios including, but not limited to, cloud technology, cloud games, AI, intelligent transportation, and assisted driving.

As shown in FIG. 1, each terminal device in the terminal cluster can be installed with an application client. When the application client runs in each terminal device, the data interaction may be performed with any service node in the above service node cluster 100. As such, any service node in the above service node cluster 100 may receive service data from each terminal device. The application client may be a game application, a video editing application, a social application, an instant communication application, a live broadcast application, a short video application, a video application, a music application, a shopping application, a novel application, a payment application, a browser, or other application clients having the function of displaying data information, such as text, images, audio, and video. The application client may be an independent client or an embedded sub-client integrated in a certain client (such as the instant communication client, the social communication client, and the video client), which is not limited herein.

The terminal device bound with the target object may acquire the off-chain digital product by the application client. The off-chain digital product may include media data that can be bound with the on-chain virtual resource, such as pictures, videos, music, and game equipment. The on-chain virtual resource is used for representing the ownership right of the media data stored in the blockchain network and can be understood as a credential. When the target object has the only ownership right of a certain on-chain virtual resource, it can be proved that the media data bound with the on-chain virtual resource belongs to the target object.

To make the off-chain digital product owned by the target object closer to the requirements of the target object, the embodiments of this application provide a blockchain-based data processing method. The method includes: a terminal device may display a plurality of media elements for selection by an application client; the terminal device may acquire a target media element combination composed of selected media elements in response to a selection operation of a target object for the media elements, element types of the media elements in the target media element combination being different from each other; the terminal device may generate target combined media data corresponding to the target media element combination in response to a virtual resource creation operation for the target media element combination; and the terminal device may transmit a virtual resource creation request for the target combined media data to a blockchain network to create a target on-chain virtual resource corresponding to the target combined media data in response to determining, by the blockchain network, that the target combined media data passes duplicate check and verification, the only ownership right of the target on-chain virtual resource belonging to the target object at this time. The target combined media data may only generate the sole target on-chain virtual resource in the blockchain network. If the target on-chain virtual resource is generated successfully, other on-chain virtual resources may not be generated for the target combined media data in the blockchain network.

Figure 2:
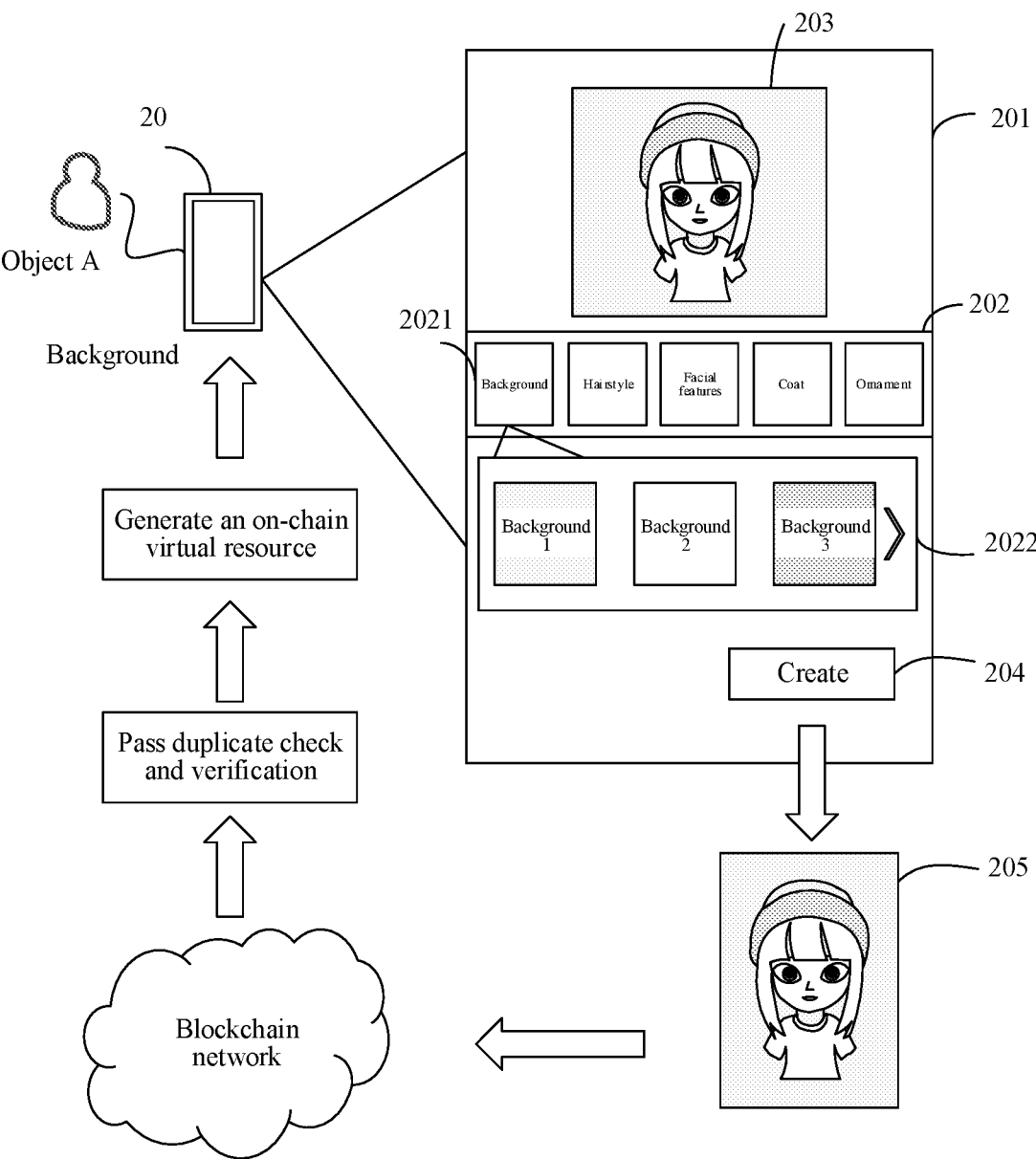
FIG. 2 is a schematic illustration of a scene for blockchain-based data processing provided in an embodiment of this application.

To facilitate the understanding of the above process, the finally obtained target combined media data being a picture is taken as an example for explanation. The media elements for selection displayed by the client may be image elements. When the terminal device responds to the selection operation for the media elements, the obtained target media element combination may be a target image element combination. Reference may be made to FIG. 2. FIG. 2 is a schematic illustration of a scene for blockchain-based data processing provided in an embodiment of this application. A terminal device 20 shown in FIG. 2 may be any terminal device in the above terminal device cluster 10 shown in FIG. 1. For example, the terminal device 20 may be the terminal device 10a. A blockchain network 200 shown in FIG. 2 may be the above blockchain network together formed by the service node cluster 100 and the consensus node cluster 1000 shown in FIG. 1.

As shown in FIG. 2, the terminal device 20 has a binding relationship with an object A. If an application client of a social application is installed in the terminal device 20, a common object with a permission to log in the social application may acquire an image bound with the on-chain virtual resource. The object A may first create an image to be bound with the on-chain virtual resource based on his own preference. In the practical application, the terminal device 20 may display an image creation interface 201 by the application client of the social application, and the image creation interface 201 may include an image element selection list 202, an image preview area 203 and a virtual resource creation control 204. The image element selection list 202 includes different element types, for example, background, hairstyle, facial features, coat, and ornament. When the object A triggers a selection control corresponding to a certain element type, the terminal device 20 may display an image element sub-list corresponding to the element type. The image element sub-list may include image elements belonging to the element type. For example, the object A triggers a selection control 2021 corresponding to the background, and the terminal device 20 may display an image element sub-list 2022 corresponding to the background. The image element sub-list 2022 may include image elements, such as a background 1, a background 2, and a background 3. It can be understood that the presentation styles of the background 1, the background 2, and the background 3 are different. For example, there may be different colors, patterns, and the like from each other. The object A may select the image elements which he likes from the image element sub-list 2022 as the background of his image to be bound with the on-chain virtual resource. Similarly, the object A may select the image elements which he likes from the image element sub-list corresponding to other element types. The terminal device 20 determines the target image element combination in response to the selection operation of the object A for the image element selection list 202. If the image elements selected by the object A are the background 1, a hairstyle 3, facial features 1, a coat 4 and an ornament 2, the target image element combination is [the background 1, the hairstyle 3, the facial features 1, the coat 4 and the ornament 2]. In addition, the terminal device 20 may display a combined preview image corresponding to the image elements selected by the object A in the image preview area 203. As such, the object A obtains the overall effect of the fused target image element combination which he selects. If the object A is not satisfied, the selected image elements may be replaced at any time. After the object A selects, the virtual resource creation control 204 may be triggered to apply for generating a corresponding on-chain virtual resource for the target image element combination which he selects.

As shown in FIG. 2, the terminal device 20 generates a target combined picture 205 composed of the image elements in the target image element combination in response to the virtual resource creation operation of the object A for the target image element combination. It is understood that the target combined picture 205 may be stored in a high definition form. The above combined preview image displayed in the image preview area 203 may be an image presented in a simple picture generated by fusing the image elements, and the resolution and definition thereof may be lower than that of the target combined picture 205. The combined preview image may also be an image obtained by rendering the data corresponding to the image elements by the terminal device. Subsequently, the terminal device 20 may transmit a virtual resource creation request for the target combined picture 205 to the blockchain network, and the blockchain network may perform duplicate check and verification on the target combined picture 205. A purpose of the duplicate check and verification is to verify whether the target image element combination constituting the target combined picture 205 is occupied in the blockchain ledger. If the target image element combination is unoccupied, it indicates that the target combined picture 205 is unique, the picture composed of the target image element combination is not bound with the on-chain virtual resource in the blockchain network, and the blockchain network can generate the on-chain virtual resource for the target combined picture 205. If the target image element combination is occupied, it indicates that the picture composed of the target image element combination is already bound with the on-chain virtual resource in the blockchain network, and the blockchain network cannot generate the on-chain virtual resource for the target combined picture 205 also composed of the target image element combination. If the target combined picture 205 passes the duplicate check and verification, the blockchain network can generate the on-chain virtual resource for the target combined picture 205 and bind the target combined picture 205, the on-chain virtual resource and the object A. Then the blockchain network may return a message that the on-chain virtual resource is created successfully to the terminal device 20. The terminal device 20 may display the information of successful resource creation and display the target combined picture 205. The object A has the only ownership right of the on-chain virtual resource bound with the target combined picture 205. It represents that the target combined picture 205 belongs to the object A, and then other objects cannot apply for creating the on-chain virtual resource of the picture composed of the target image element combination. However, the object A may transfer the only ownership right of the on-chain virtual resource bound with the target combined picture 205 to other objects in the blockchain network in a transaction form. It is understood that the target combined picture 205 has a binding relationship with the object A. Therefore, in the blockchain network, the target combined picture 205 may serve as an identity identification of the object A in the social application, e.g., the target combined picture 205 may serve as a proprietary avatar of the object A in the social application.

It can be understood that the image type of the combined picture composed of the image elements under the element types included in the above image element selection list 202 is a character portrait type, and the resource platform party corresponding to the social application may also provide the image elements of other element types. As such, the common object may create the combined picture of other image types, such as a home scene dressing type, a pet dressing type, a game equipment assembly type, a building construction type, and an assembly type of a vehicle or other machinery.

It can be understood that, in the specific implementations of this application, when the above embodiments of this application are applied to a specific product or technology, the obtained data related to the element data selected by the common object needs to obtain the user's permission or consent, and the collection, use and processing of the relevant data need to comply with the relevant laws, regulations and standards of the relevant countries and regions.

By the blockchain-based data processing method provided in the embodiments of this application, the target object may first create the target combined media data which he likes by the media element selection list without only selecting the media data from the media data bound with the on-chain virtual resource as his own off-chain digital product. Then the terminal device may transmit the virtual resource creation request for the target combined media data to the blockchain network. When it is determined that the target combined media data passes the duplicate check and verification, the blockchain network may generate the target on-chain virtual resource corresponding to the target combined media data. By the combination of the media elements, the presentation style of the finally obtained target combined media data increases. Once the target combined media data is generated, it will be bound with the target object. In addition, there will be no situation where no man acquires it, which can reduce the waste of the on-chain virtual resource.

Figure 3:
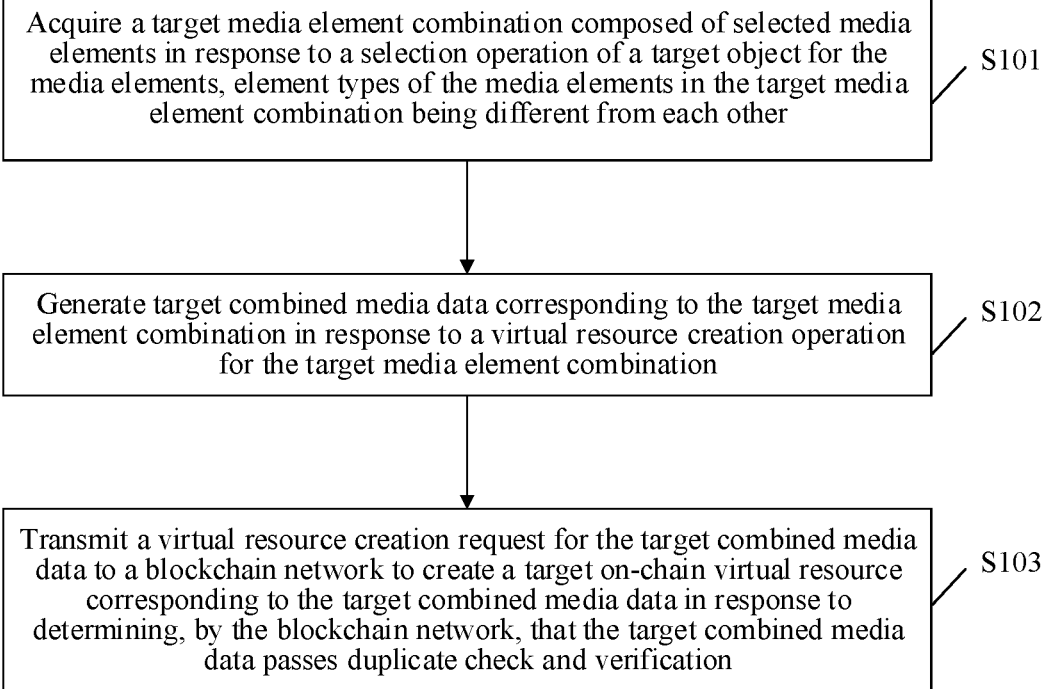
FIG. 3 is a flowchart of a blockchain-based data processing method provided in an embodiment of this application.

In some embodiments, reference may be made to FIG. 3. FIG. 3 is a flowchart of a blockchain-based data processing method provided in an embodiment of this application. The method may be performed by the terminal device (e.g., any terminal device of the terminal device cluster 10 in the embodiment corresponding to FIG. 1 described above). The method being performed by the terminal device is taken as an example for explanation below. The blockchain-based data processing method may include at least the following steps S101-S103.

Step S101: Acquire a target media element combination composed of selected media elements in response to a selection operation of a target object for the media elements, element types of the media elements in the target media element combination being different from each other.

In the process of selecting the media elements, the terminal may display a plurality of the media elements for selection. In the practical application, the plurality of the media elements for selection may be presented by different ways, for example, by the media element selection list. The media element selection list includes a media element sub-list corresponding to each element type. Each media element sub-list corresponds to one element type, and each media element sub-list may include at least one media element. As another example, the plurality of the media elements for selection are presented by a control, and the terminal presents a sub-presentation area corresponding to each element type in the media element presentation area. Each sub-presentation area corresponds to one element type, and each sub-presentation area may include at least one media element presented by the control for the user to select.

In the practical application, the media elements of each element type may form a media element set. When the set composed of all the media elements for selection is referred to as a general set of the media elements, the general set of the media elements may be presented by the media element selection list. By contrast, the media element set is presented by the media element sub-list. The terminal acquires the selected media element in each media element set and determines the selected media elements in different types of media element sets as the target media element combination in response to the selection operation of the target object for the media elements in the media element sets with different element types.

Exemplarily, a plurality of the media elements for selection are presented by the media element selection list. The media elements in the media element selection list are used for constituting the target combined media data, and the data type of the target combined media data may include an image type, a video type, a music type, and an article type. Therefore, the media elements may include the media elements of different data types, such as an image element, a video element, a text element, and a music element. It can be understood that the data type of the media elements in the media element selection list is consistent with that of the target combined media data.

In the practical application, the media element selection list may include m media element sub-lists. A media element sub-list may include n media elements with the same element type, and the n media elements are different. The m and the n are both positive integers. In some embodiments, the m and the n are both positive integers not less than 2. At this time, the implementation process of acquiring the target media element combination in response to the selection operation of the target object for the media element selection list may include: acquiring the selected media element in each media element sub-list and determining the selected media elements as the target media element combination in response to the selection operation of the target object for the m media element sub-lists. It can be understood that the target media element combination will include the media elements of m different element types.

In some embodiments, the terminal device may display a preview area. In the process of selecting by the target object for the media element selection list, the terminal device may display the preview media data based on the media elements selected by the target object. As such, the target object may know the overall effect when the fused media elements which he selects, and the target object may replace the selected media elements at any time. Therefore, after the terminal device determines the target media element combination, combined preview media data corresponding to the target media element combination will be displayed, the combined preview media data being obtained by fusing the media elements in the target media element combination, e.g., the above combined preview image in the image preview area 203 shown in FIG. 2.

Step S102: Generate target combined media data corresponding to the target media element combination in response to a virtual resource creation operation for the target media element combination.

In the practical application, different combination ways may be selected to process m media elements in the target media element combination to obtain the target combined media data based on the data type of the media elements in the target media element combination. The combination ways include splicing, superposition, fusion, and insertion.

In the practical application, when the media element is an image element, the target combined media data may be generated by layer superposition. In response to the virtual resource creation operation for the target media element combination, the target combined media data composed of the media elements in the target media element combination may be generated by the following ways: acquiring element media layers separately corresponding to the m media elements in response to the virtual resource creation operation for the target media element combination; recalling an image service and performing layer superposition on m element media layers to obtain the target combined media data based on an element combination order configured in the image service. The target combined media data herein is a picture, and therefore it can also be referred to as a target combined picture. That is to say, for the target image element combination including m image elements, the corresponding target combined picture may be composed of m element media layers, and each element media layer corresponds to an element type. For example, the element type corresponding to the first element media layer is a hairstyle, and the element type corresponding to the second element media layer is an eye. After the target image element combination is determined, the image service may be recalled to add the image elements in the target image element combination into the corresponding element media layer, and then cover same downward based on the element combination order configured in the image service. In this way, the final target combined picture may be formed.

Figure 4:
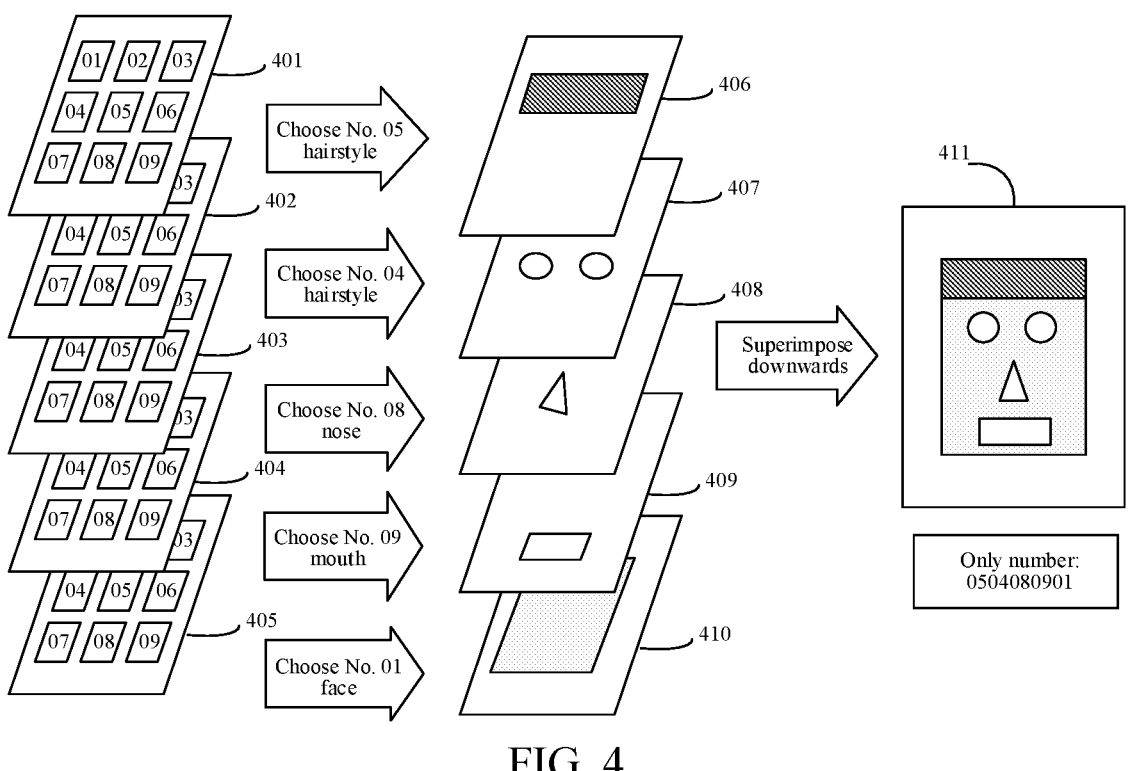
FIG. 4 is a schematic illustration of a scene for layer superposition provided in an embodiment of this application.

To facilitate understanding, reference may be made to FIG. 4. FIG. 4 is a schematic illustration of a scene for layer superposition provided in an embodiment of this application. It is assumed that there are five element types of the image elements for the target object to select, namely, a hairstyle, eyes, a nose, a mouth, and a face. Nine image elements are included in each element type, and the image elements are presented in different patterns, for example, different colors from each other or different shapes from each other. Therefore, the image elements under each element type may be numbered starting from 01. The numbers corresponding to different image elements under the same element type are different, and the respective image elements are selected by the numbers. As shown in FIG. 4, the element media layer sets used for performing layer superposition include a layer set 401, a layer set 402, a layer set 403, a layer set 404, and a layer set 405. The element type of the image element corresponding to the layer in the layer set 401 may be a hairstyle. The element type of the image element corresponding to the layer in the layer set 402 may be an eye. The element type of the image element corresponding to the layer in the layer set 403 may be a nose. The element type of the image element corresponding to the layer in the layer set 404 may be a mouth. The element type of the image element corresponding to the layer in the layer set 405 may be a face. It is assumed that the layer set 401 includes layers separately corresponding to No. 01 hairstyle . . . No. 08 hairstyle, and No. 09 hairstyle. The layer set 402 includes layers separately corresponding to No. 01 eyes . . . No. 08 eyes, and No. 09 eyes. The layer set 403 includes layers separately corresponding to No. 01 nose . . . No. 08 nose, and No. 09 nose. The layer set 404 includes layers separately corresponding to No. 01 mouth . . . No. 08 mouth, and No. 09 mouth. The layer set 405 includes layers separately corresponding to No. 01 face . . . No. 08 face, or No. 09 face. If the target image element combination is [the No. 05 hairstyle, the No. 04 eyes, the No. 08 nose, the No. 09 mouth, and the No. 01 face], the terminal device may recall the image service to acquire a layer 406 corresponding to the No. 05 hairstyle, a layer 407 corresponding to the No. 04 eyes, a layer 408 corresponding to the No. 08 nose, a layer 409 corresponding to the No. 09 mouth, and a layer 410 corresponding to the No. 01 face. Then, the terminal device may superimpose the layers downwards based on a pre-configured element combination order. For example, the element combination order is {hairstyle-eyes-nose-mouth-face}, i.e., placing the layer 406 corresponding to the hairstyle on the uppermost layer, superimposing the layer 407 corresponding to the eyes under the layer 406, and so on to obtain the final target combined picture 411. In addition, the only number may be obtained by splicing the numbers corresponding to each image element based on the element combination order, and the number may be used as a number for identifying the target combined picture 411. As shown in FIG. 4, the only number of the target combined picture 411 is 0504080901. The number may be used for the duplicate check of the combined picture. The specific implementation may refer to the following embodiment corresponding to FIG. 5.

In the practical application, when the media element is the text element or the music element, each media element corresponds to an element media data segment, and the target combined media data may be generated by segment splicing. In response to the virtual resource creation operation for the target media element combination, the target combined media data corresponding to the target media element combination may be generated by the following ways: acquiring element media data segments separately corresponding to the m media elements in response to the virtual resource creation operation for the target media element combination; recalling a segment splicing service and performing segment splicing on m element media data segments to obtain the target combined media data based on an element combination order configured in the segment splicing service. For example, when the media element is the text element, the target media element combination may also be referred to as a target text element combination. It is assumed that there are four element types of the text elements for the target object to select, namely, time, place, person, and event. The target text element combination acquired by the terminal device is [yesterday, at school, Xiaoming, learned], and each text element is the corresponding element media data segment. If the element combination order is {person-event-place-time}, the element media data segments are spliced based on the element combination order. As such, the target combined media data may be obtained, namely, the target combined sentence, whose content is "Xiaoming learned at school yesterday".

Step S103: Transmit a virtual resource creation request for the target combined media data to a blockchain network to create a target on-chain virtual resource corresponding to the target combined media data in response to determining, by the blockchain network, that the target combined media data passes duplicate check and verification.

The virtual resource creation request herein is used for requesting to create the target on-chain virtual resource corresponding to the target combined media data, that is to say, for requesting to create the target on-chain virtual resource corresponding to the target combined media data in response to determining, by the blockchain network, that the target combined media data passes duplicate check and verification, the only ownership right of the target on-chain virtual resource belonging to the target object.

In the practical application, after determining the target combined media data, the terminal device may apply for binding the on-chain virtual resource for the target combined media data. The terminal device may transmit the virtual resource creation request for the target combined media data to the blockchain network. It can be understood that the terminal device only needs to transmit the virtual resource creation request to any blockchain node in the blockchain network, and then the blockchain node receiving the virtual resource creation request will generate a transaction corresponding to the virtual resource creation request and broadcast same to other blockchain nodes in the blockchain network. In this way, consensus uplink is performed on the transaction corresponding to the virtual resource creation request.

The blockchain node may be the service node, such as any service node in the above service node cluster 100 shown in FIG. 1. It may also be the consensus node, such as any consensus node in the above consensus node cluster 1000 shown in FIG. 1.

In the practical application, the blockchain network may generate the target on-chain virtual resource corresponding to the target combined media data when it is determined that the target combined media data passes duplicate check and verification. The only ownership right of the target on-chain virtual resource belongs to the target object. The duplicate check and verification refers to determining whether the target element media combination corresponding to the target combined media data is occupied in the blockchain network. It assumed that the target element media combination is occupied by an object B, indicating that the object B transmits the virtual resource creation request for the target combined media data composed of the target element media combination to the blockchain network by the terminal device bound therewith, the target on-chain virtual resource corresponding to the target combined media data is generated in the blockchain network, and the only ownership right of the target on-chain virtual resource belongs to the object B. At this time, the object A cannot reapply for creating the target on-chain virtual resource for the target combined media data successfully. That is because the ownership right of the target combined media data belongs to the object B, and the object A can only transact with the object B for the only ownership right of the target on-chain virtual resource to obtain and have the target on-chain virtual resource.

By the blockchain-based data processing method provided in the embodiments of this application, the target object may first create the target combined media data which he likes by the media element selection list without only selecting the media data from the media data bound with the on-chain virtual resource as his own off-chain digital product. Then the terminal device may transmit the virtual resource creation request for the target combined media data to the blockchain network. When it is determined that the target combined media data passes the duplicate check and verification, the blockchain network may generate the target on-chain virtual resource corresponding to the target combined media data. By the combination of the media elements, the presentation style of the finally obtained target combined media data increases. Once the target combined media data is generated, it will be bound with the target object. In addition, there will be no situation where no man acquires it, which can reduce the waste of the on-chain virtual resource.

In some embodiments, reference may be made to FIG. 5. FIG. 5 is a flowchart of a blockchain-based data processing method provided in an embodiment of this application. The method may be performed by the terminal device (e.g., any terminal device of the terminal device cluster 10 in the embodiment corresponding to FIG. 1 described above). The method being performed by the terminal device is taken as an example for explanation below. The blockchain-based data processing method may include at least the following steps S201-S206.

Step S201: Acquire a target media element combination composed of selected media elements in response to a selection operation of a target object for the media elements.

Element types of the media elements in the target media element combination are different from each other.

In the practical application, the implementation process of step S201 may refer to the above description of step S101 in the embodiment corresponding to FIG. 3, which will not be described in detail herein.

Step S202: Generate a target combination identification corresponding to the target media element combination in response to a duplicate check operation for the target media element combination.

In the practical application, the terminal device may display a duplicate check control while displaying the media element selection list. After selecting the media elements which he likes, the target object may determine whether the media element combination composed of the media elements which he likes is occupied by triggering the duplicate check control. The combined media data composed of the occupied media element combination is bound with the on-chain virtual resource on the blockchain. Assuming that the target object selects the target media element combination and then triggers the duplicate check control, the terminal device will perform duplicate check on the target media element combination in response to the trigger operation of the target object for the duplicate check control.

In the practical application, performing duplicate check on the target media element combination may be comparing the target media element combination with the occupied media element combination on the blockchain on the one-to-one basis. If it is determined that there is a media element combination identical to the target media element combination in the occupied media element combination, the target media element combination is occupied and fails to pass the duplicate check; otherwise, the target media element combination passes the duplicate check.

In the practical application, the above media elements may be image elements, text elements, music elements, and the like. It can be understood that the comparison of these elements requires a large amount of calculation; therefore, the terminal device may determine the only combination identification for each media element combination. The combination identification may be composed of simple data, such as numbers and letters. When the terminal device performs the duplicate check of the target media element combination, the terminal device does not need to perform the duplicate check of the media elements in the target media element combination. It is only necessary to determine whether the target combination identification corresponding to the target media element combination is the same as the combination identification corresponding to the occupied media element combination.

In the practical application, in response to the duplicate check operation for the target media element combination, the target combination identification corresponding to the target media element combination may be generated by the following ways: separately determining element numbers of respective media elements in the target media element combination in element types to which the media elements belong as target element numbers in response to the duplicate check operation for the target media element combination, media elements belonging to the same element type having different element numbers from each other; and splicing the target element numbers, namely, the element numbers of the respective media elements in the element types to which the media elements belong to obtain the target combination identification based on an element combination order. The element combination order refers to a combination order between the respective media elements in the target media element combination in generating the target combined media data. The media elements of the same element type provided in the media element selection list corresponds to different numbers. For example, in the above embodiment shown in FIG. 4, there are 9 image elements belonging to the hairstyle, separately corresponding to nine numbers from 01 to 09, which are not repeated with each other. However, the numbers corresponding to the media elements of different element types are not related and may be repeated with each other. For the media elements under each element type, the terminal device may start numbering from 01. After splicing the number of each media element in the target media element combination based on the element combination order, the terminal device may obtain the only number. The only number may be used as the target combination identification of the target media element combination. For example, in the above embodiment shown in FIG. 4, the only number 0504080901 of the target combined picture 411 may be the corresponding target combination identification.

In the practical application, in response to the duplicate check operation for the target media element combination, the target combination identification corresponding to the target media element combination may be generated by the following ways: separately performing first hash processing on respective media elements in the target media element combination to obtain element hash values; and performing second hash processing on the element hash values to obtain the target combination identification based on an element combination order. The element combination order refers to a combination order between the respective media elements in the target media element combination in generating the target combined media data. The hash processing refers to compressing a message or data into a summary by a hash function so that the amount of data becomes small. When the hash processing is performed on two pieces of data, although there is only a small difference, the obtained hash values are very different. Therefore, the element hash values corresponding to different media elements are different. Therefore, after performing the hash processing on the target media element combination twice, the obtained hash values may be used as the only target combination identification to identify the target media element combination.

Step S203: Display information prompting that the combination is occupied when a combination identification same as the target combination identification is found in an identification database; and display information prompting that the combination is unoccupied when the combination identification same as the target combination identification is not found in the identification database.

In the practical application, to save the overhead caused by making a request to the blockchain network, the terminal device may store the combination identification corresponding to the occupied media element combination in the identification database. Whenever there is a new block uplink in the blockchain network, and the block includes a transaction for generating the on-chain virtual resource corresponding to the combined media data composed of a certain media element combination, the terminal device records the combination identification corresponding to the media element combination into the identification database. Therefore, one feasible method for the terminal device to perform the duplicate check on the target media element combination includes: acquiring the target combination identification corresponding to the target media element combination and then traversing the identification database. The information prompting that the combination is occupied is displayed when the combination identification same as the target combination identification is found in the identification database. The information prompting that the combination is occupied is used for prompting that there is a target combination identification corresponding to the target media element combination in the identification database. That is to say, the target on-chain virtual resource corresponding to the target media element combination is created in the blockchain network. At this moment, the target object may reselect the media selection list. The information prompting that the combination is unoccupied is displayed when the combination identification same as the target combination identification is not found in the identification database. At this moment, the target object may perform a virtual resource creation operation on the target media element combination and may also reselect the media selection list.

Step S204: Generate the target combination identification corresponding to the target media element combination based on a virtual resource creation operation in response to the virtual resource creation operation for the target media element combination.

In the practical application, the duplicate check operation for the target media element combination and the virtual resource creation operation for the target media element combination may be considered as two independent operations. Namely, performing the duplicate check operation does not trigger the generation of the on-chain virtual resource. Furthermore, to save the overhead generated by making a request to the blockchain network, when responding to the virtual resource creation operation for the target media element combination, the duplicate check operation may be automatically performed once. When it passes the duplicate check and verification, the step of transmitting the virtual resource creation request for the target combined media data to the blockchain network is triggered to be performed. Therefore, when responding to the virtual resource creation operation for the target media element combination, the terminal device may generate the target combination identification corresponding to the target media element combination, and then perform the duplicate check on the target media element combination based on the target combination identification. Reference may be made to the above step S203, which will not be described in detail herein. If the terminal device responded to the duplicate check operation for the target media element combination, the terminal device may directly obtain the previously generated target combination identification.

Step S205: Generate target combined media data corresponding to the target media element combination when the combination identification same as the target combination identification is not found in the identification database.

In the practical application, when the terminal device determines that the target media element combination is unoccupied, the target combined media data composed of the media elements in the target media element combination may be generated. The specific generation process may refer to the above description of step S102 in the embodiment corresponding to FIG. 3, which will not be described in detail herein. The terminal device may display information prompting that the combination is occupied when the combination identification same as the target combination identification is found in the identification database.

Step S206: Transmit the virtual resource creation request for the target combined media data to a blockchain network to generate a target on-chain virtual resource corresponding to the target combined media data in response to determining, by the blockchain network, that the target combined media data passes duplicate check and verification.

The only ownership right of the target on-chain virtual resource belongs to the target object.

In the practical application, the implementation process of step S206 may refer to the above description of step S103 in the embodiment corresponding to FIG. 3, which will not be described in detail herein.

In some embodiments, after the on-chain virtual resource corresponding to the target combined media data composed of the target media element combination is created successfully, the target media element combination is occupied, and the on-chain virtual resource cannot be applied for the target combined media data composed of the target media element combination. Therefore, the terminal device may update the identification database. That is to say, when the target on-chain virtual resource is created successfully, the terminal device may display the information of successful resource creation for prompting the target object to apply for a request, and the terminal device adds the target combination identification into the identification database to obtain the updated identification database.

In some embodiments, since the blockchain network is a multi-node network, and data synchronization requires time, the combination identification stored in the identification database may not be completely the same as the combination identification in the blockchain ledger. Therefore, when the target media element combination passes the duplicate check of the terminal device, the target combined media data may fail to pass the duplicate check and verification in the blockchain network. When the target combined media data fails to pass the duplicate check and verification in the blockchain network, the terminal device displays the information prompting that the combination is occupied, and then adds the target combination identification into the identification database to obtain the updated identification database.

In some embodiments, it is difficult for the target object to find an unoccupied media element combination after most of the media element combinations are registered at a later stage. For this problem, the operation cost of the target object can be considered to be simplified by recommending a random media element combination, and the target object may find a favorite media element combination by multiple random ways. The terminal device may acquire a random media element combination composed of randomly selected media elements in response to a random combination operation of the target object for the media elements. The random media element combination includes the random media elements randomly selected in the media element selection list based on the random combination operation. In addition, a random combination identification corresponding to the random media element combination is different from a combination identification in an identification database. Then the terminal device may generate random combined media data composed of the media elements in the random media element combination in response to a virtual resource creation operation for the random media element combination, and then transmit a virtual resource creation request for the random combination media data to the blockchain network, and transmit a virtual resource creation request for the random combined media data to the blockchain network to generate a random on-chain virtual resource corresponding to the target random combined media data in response to determining, by the blockchain network, that the random combined media data passes the duplicate check and verification, the only ownership right of the random on-chain virtual resource belonging to the target object. The generation of the random combined media data and the generation of the random on-chain virtual resource may refer to the descriptions of step S102 and step S103, which will not be described in detail herein.

In some embodiments, after the on-chain virtual resource corresponding to the target combined media data is generated, the ownership right of the target combined media data only belongs to the target object. The target media element combination corresponding to the target combined media data and the target combination identification corresponding to the target media element combination are unique, and therefore the target combination identification may be used as an identity credential of the target object. The terminal device may perform data identification on the target combined media data bound with the target on-chain virtual resource to obtain the target media element combination corresponding to the target combined media data; and generate a target combination identification corresponding to the target media element combination based on an element combination order, the target combination identification being used for characterizing the target object in the blockchain network. The element combination order refers to a combination order between the respective media elements in the target media element combination in generating the target combined media data.

By adopting the method provided in the embodiments of this application, the target media element combination is identified by the target combination identification. It can reduce the calculation amount of directly comparing whether the target media element combinations are same, thus saving calculation resources. At the same time, the identification database is provided outside the blockchain for caching the combination identification corresponding to the media element combination occupied by the common object. When the terminal device subsequently eliminates the element duplicate, a round of duplicate check may be performed in the identification database first, thereby reducing interaction with the blockchain network and saving network resources.

In some embodiments, reference may be made to FIG. 6. FIG. 6 is a flowchart of a blockchain-based data processing method provided in an embodiment of this application. The method may be performed by the blockchain node (for example, any service node in the above service node cluster 100 in the embodiment corresponding to FIG. 1 or any consensus node in the above consensus node cluster 1000 in the embodiment corresponding to FIG. 1). The method being performed by the blockchain node is taken as an example for explanation below. The blockchain-based data processing method may include at least the following steps S301-S303.

Step S301: Receive a virtual resource creation request for target combined media data, the target combined media data being generated based on a target media element combination, the target media element combination including selected media elements based on a selection operation of a target object for the media elements, and element types of the media elements in the target media element combination being different from each other.

In the practical application, the selection of the target media element combination and the generation of the target combined media data are completed by the terminal device. The implementation process may refer to the above descriptions of step S101 and step S102 in the embodiment corresponding to FIG. 3, which will not be described in detail herein.

Step S302: Perform duplicate check and verification on the target combined media data to obtain a duplicate check and verification result.

In the practical application, the blockchain node in the blockchain network performs duplicate check and verification on the target combined media data, i.e., determining whether the target media element combination corresponding to the target combined media data corresponds to the on-chain virtual resource in the blockchain ledger. If the target media element combination corresponds to the on-chain virtual resource, the target combined media data fails to pass the duplicate check and verification; if the target media element combination does not correspond to the on-chain virtual resource, the target combined media data fails to pass the duplicate check and verification.

In the practical application, duplicate check and verification is performed on the target combined media data to obtain a duplicate check and verification result by the following way: acquiring published combination identifications having a binding relationship with a published on-chain virtual resource from a blockchain ledger, the published combination identifications being generated based on a media element combination of combined media data associated with the published on-chain virtual resource. It is determined that the duplicate check and verification result indicates that the target combined media data fails to pass the duplicate check and verification when a combination identification same as the target combination identification is found in the published combination identifications. It is determined that the duplicate check and verification result indicates that the target combined media data passes the duplicate check and verification when the combination identification same as the target combination identification is not found in the published combination identifications.

Step S303: Generate a target on-chain virtual resource corresponding to the target combined media data when the duplicate check and verification result indicates that the target combined media data passes the duplicate check and verification, the only ownership right of the target on-chain virtual resource belonging to the target object.

In the practical application, the virtual resource creation request may carry a resource creation contract identification. The blockchain node may recall a resource creation contract corresponding to the resource creation contract identification. In the process of performing the resource creation contract, the blockchain node may perform consensus processes, such as the above duplicate check and verification processing and data validity verification on the target combined media data. When the target combined media data passes the duplicate check and verification, and the data is valid, the blockchain node may normally perform the resource creation function to generate the target on-chain virtual resource corresponding to the target combined media data. If the only ownership right of the target on-chain virtual resource generated by the blockchain node belongs to the target object, then the target on-chain virtual resource may be used for proving that the ownership right of the target combined media data belongs to the target object. The target object may initiate a transaction for the target on-chain virtual resource by the bound terminal device. For example, the only ownership right of the target on-chain virtual resource is transferred to the first object. When the transaction is successful, the ownership right of the target combined media data no longer belongs to the target object, but belongs to the first object.

In some embodiments, the blockchain node writes a binding relationship between the target on-chain virtual resource, the target combination identification, and the target object into the blockchain ledger, the target combination identification being generated based on the media elements in the target media element combination. The specific generation method may refer to the above description of step S203 in the embodiment corresponding to FIG. 5, which will not be described in detail herein.

By adopting the method provided in the embodiments of this application, the blockchain network may create the on-chain virtual resource for the target combined media data created by the target object. The on-chain virtual resource will be bound with the target object, and there will be no situation where the on-chain virtual resource is created in advance, but no man acquires it, which can avoid the waste of the on-chain virtual resource.

Figure 7:
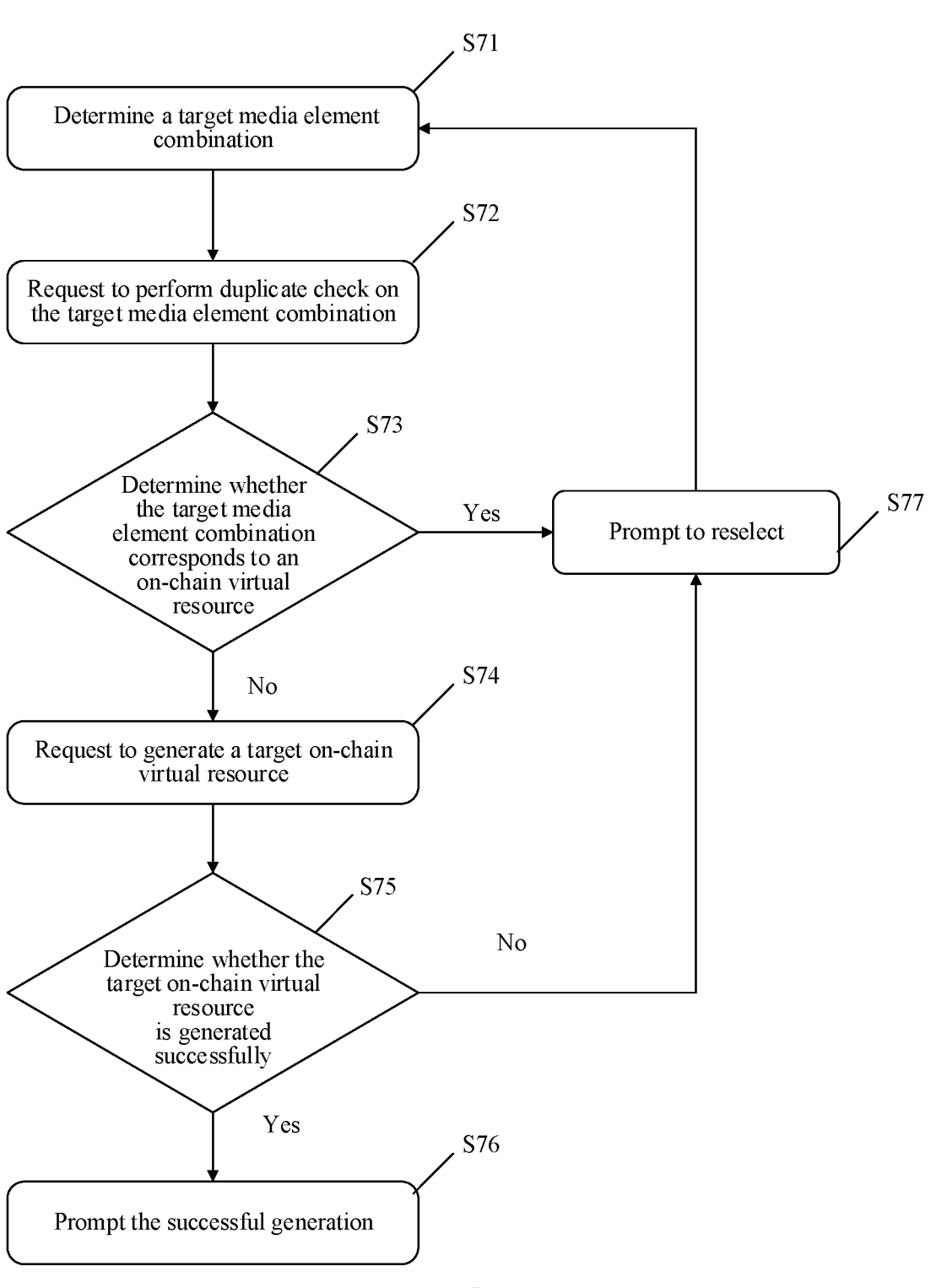
FIG. 7 is a flowchart of a logical method for generating an on-chain virtual resource provided in an embodiment of this application.

In some embodiments, reference may be made to FIG. 7. FIG. 7 is a flowchart of a logical method for generating an on-chain virtual resource provided in an embodiment of this application. As shown in FIG. 7, the logical method for generating the on-chain virtual resource may include at least the following steps S71-S77.

Step S71: Determine a target media element combination.

In the practical application, the resource platform party may provide the target object with m types of elements (the element types corresponding to the same type of elements are same), and each type of elements includes n media elements. The m and the n are integers. All the elements provided by the resource platform party may be selected by the target object by the above media element selection list, and a type of elements can correspond to a media element sub-list. The target object needs to select one element from each type of elements, namely, each media element sub-list, and the terminal device may obtain the target media element combination by combining the selected media elements with m different element types. It can be understood that the number of the media element combinations for the target object to select is $m^n$.

Step S72: Request to perform duplicate check on the target media element combination.

In the practical application, the media element combination corresponding to the on-chain virtual resource may no longer be selected. Therefore, the target object may request to perform the duplicate check on the selected target media element combination.

Step S73: Determine whether the target media element combination corresponds to an on-chain virtual resource.

In the practical application, the process of the duplicate check may be completed by the terminal device. The specific implementation may refer to the relevant descriptions of step S202 and step S203 in the embodiment corresponding to FIG. 5. The process of the duplicate check may also be implemented by the blockchain network. The terminal device may transmit a duplicate check request to the blockchain node in the blockchain network, and the blockchain node may check whether there is the on-chain virtual resource corresponding to the target media element combination in the blockchain ledger. If the target media element combination does not correspond to the on-chain virtual resource, step S74 is performed; if the target media element combination corresponds to the on-chain virtual resource, step S75 is performed.

Step S74: Request to generate a target on-chain virtual resource corresponding to the target media element combination.

In the practical application, the implementation of step S74 may refer to the above description of step S303 in the embodiment corresponding to FIG. 6, which will not be described in detail herein.

Step S75: Determine whether the target on-chain virtual resource is generated successfully.

In the practical application, if the target on-chain virtual resource is generated successfully, step S76 is performed; if the target on-chain virtual resource is not generated successfully, step S77 is performed.

Step S76: Prompt that the target on-chain virtual resource is generated successfully.

Step S77: Prompt to reselect the target media element combination.

By adopting the method provided in the embodiments of this application, a large number of the media element combinations may be obtained by investing and combining only a small amount of the media element resources. As such, the target object may select a combination which he likes as the target media element combination, and it is ensured that the target media element combination is unique. Then the target media element combination is bound with the on-chain virtual resource. The blockchain has the tamper-proof property and asset confirmation capability, thus achieving the uniqueness of the ownership right on the chain of the target combined media data composed of the target media element combination.

Figure 8A:
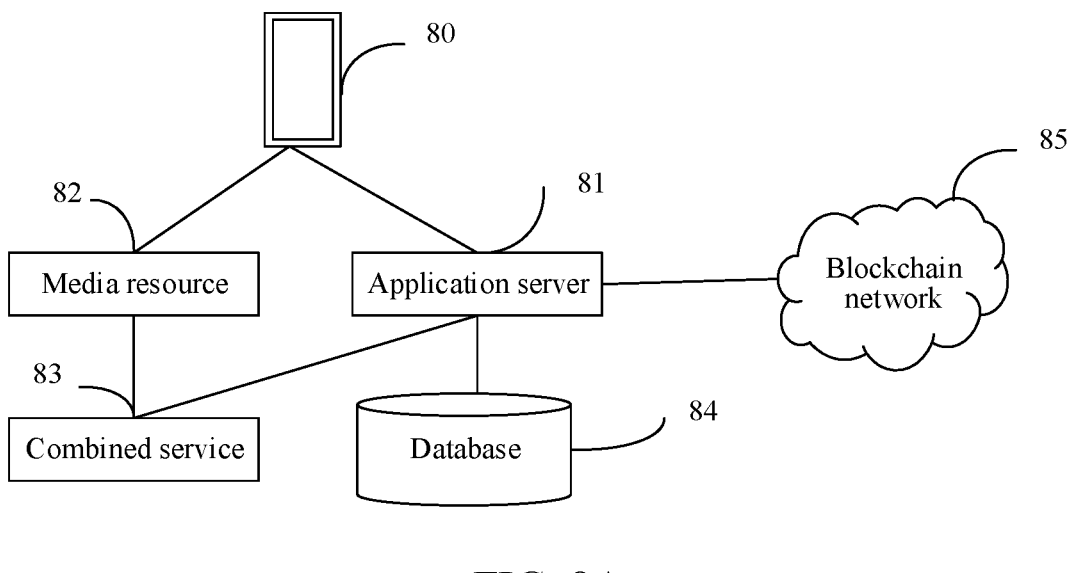
FIG. 8A is a schematic illustration of a system architecture provided in an embodiment of this application.

In some embodiments, reference may be made to FIG. 8A. FIG. 8A is a schematic illustration of a system architecture provided in an embodiment of this application. As shown in FIG. 8A, the schematic illustration of the system architecture includes a terminal device 80, an application server 81, a media resource 82, a combined service 83, a database 84, and a blockchain network 85. The terminal device 80 may be any terminal device in the terminal device cluster 10 shown in FIG. 1 described above, such as the terminal device 10a. The application server 81 may be an applet, a native application (App), or a background server corresponding to the hyper text markup language 5 (H5) page. The client/server (C/S) or browser/server (B/S) modes may be adopted in the architecture. The media resource 82 includes the media elements for constituting the combined media data. The combined service 83 is used for combining the media elements into the combined media data. It may include the image superposition service and the segment splicing service in step S102 in the above embodiment corresponding to FIG. 3. The database 84, namely, the above identification database in step S203 in the embodiment corresponding to the FIG. 5, is used for performing duplicate check on the target media element combination selected by the target object so as to reduce the interaction between the terminal device 80 and the blockchain network 85.

Figure 8B:
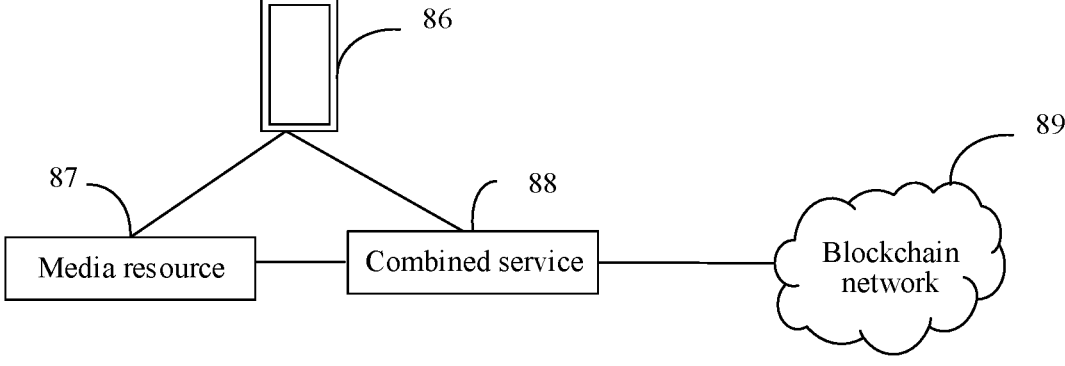
FIG. 8B is a schematic illustration of another system architecture provided in an embodiment of this application.

It can be understood that the functions provided by the application server 81 may be implemented by the terminal device 80. The database 84 may be stored in the terminal device 80. The system architecture is simpler. To facilitate understanding, reference may be made to FIG. 8B. FIG. 8B is a schematic illustration of another system architecture provided in an embodiment of this application. As shown in FIG. 8B, in this case, the system architecture only includes a terminal device 86, a media resource 87, a combined service 88, and a blockchain network 89. Under the architecture as shown in FIG. 8B, the terminal device 86 may determine the target media element combination and perform the duplicate check on the target media element combination in a locally stored database. The process of the duplicate check may refer to the above description of step S203 in the embodiment corresponding to FIG. 5, which will not be described in detail herein.

Figure 9:
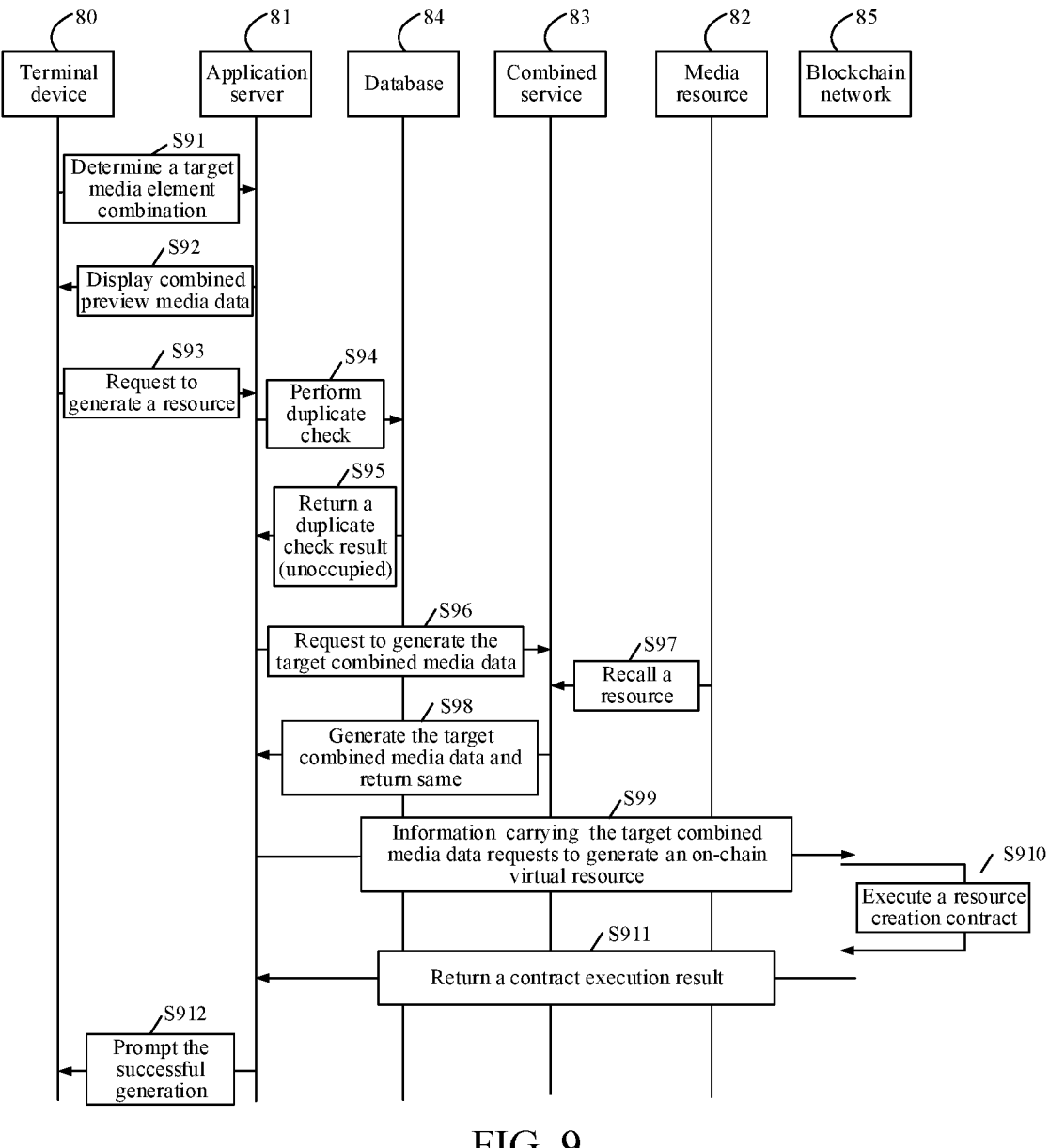
FIG. 9 is a schematic illustration of data interaction provided in an embodiment of this application.

By the system architecture as shown in FIG. 8A, the target object may autonomously select the media elements to obtain the target combined media data composed of the target media element combination, and generate the on-chain virtual resource for the target combined media data. The key to the success of the on-chain virtual resource is that it is determined that the target media element combination is unoccupied by other objects in the blockchain network 85. Therefore, the database 84 is provided outside the blockchain for caching the element combination occupied by the user. When the element duplicate is eliminated, a round of duplicate check may be performed in the database 84 first, thereby reducing interaction with the chain. To better understand the data interaction process in the system architecture, reference may be made to FIG. 9. FIG. 9 is a schematic illustration of data interaction provided in an embodiment of this application. As shown in FIG. 9, when the terminal device 80, the application server 81, the media resource 82, the combined service 83, the database 84, and the blockchain network 85 together complete the creation of the on-chain virtual resource corresponding to target combined media data composed of the target media element combination selected by the target object, the data interaction process therebetween includes the following steps S91-S912.

Step S91: The application server 81 may determine a target media element combination in response to a selection operation of the terminal device 80.

Step S92: The application server 81 may determine combined preview media data based on the target media element combination, the application server 81 then returns the combined preview media data to the terminal device 80, and the terminal device 80 displays the combined preview media data.

Step S93: The terminal device 80 may request the application server 81 to generate target combined media data corresponding to the target media element combination.

Step S94: The application server 81 may request the database 82 to perform duplicate check on the target media element combination.

Step S95: The database 82 returns a duplicate check result for the target media element combination, continues to perform step S96 when the target media element combination is unoccupied, and skips proceeding the subsequent data interaction process when the target media element combination is occupied.

Step S96: The application server 81 requests the combined service 83 to generate the target combined media data corresponding to the target media element combination.

Step S97: The combined service 83 may recall a media resource in the database 84 based on the target media element combination.

Step S98: The combined service 83 generates the target combined media data based on the recalled media resource and returns same to the application server 81.

Step S99: The application client transmits a virtual resource creation request to the blockchain network, the virtual resource creation request carrying information of the target combined media data and being used for requesting to generate an on-chain virtual resource for the target combined media data.

Step S910: The blockchain network 85 executes a resource creation contract, performs consensus processes, such as duplicate check and data validity verification on the target media element combination in the process of executing the resource creation contract, and normally executes the resource creation contract to generate the on-chain virtual resource for the target combined media data when the consensus is approved.

Step S911: The blockchain network 85 returns a contract execution result to the application server 81, namely, whether the on-chain virtual resource is created successfully.

Step S912: The application server 81 prompts that the on-chain virtual resource is created successfully when the on-chain virtual resource is created successfully.

By adopting the method provided in the embodiments of this application, the waste of the on-chain virtual resource can be reduced and the presentation style of the off-chain digital product increases.

Figure 10:
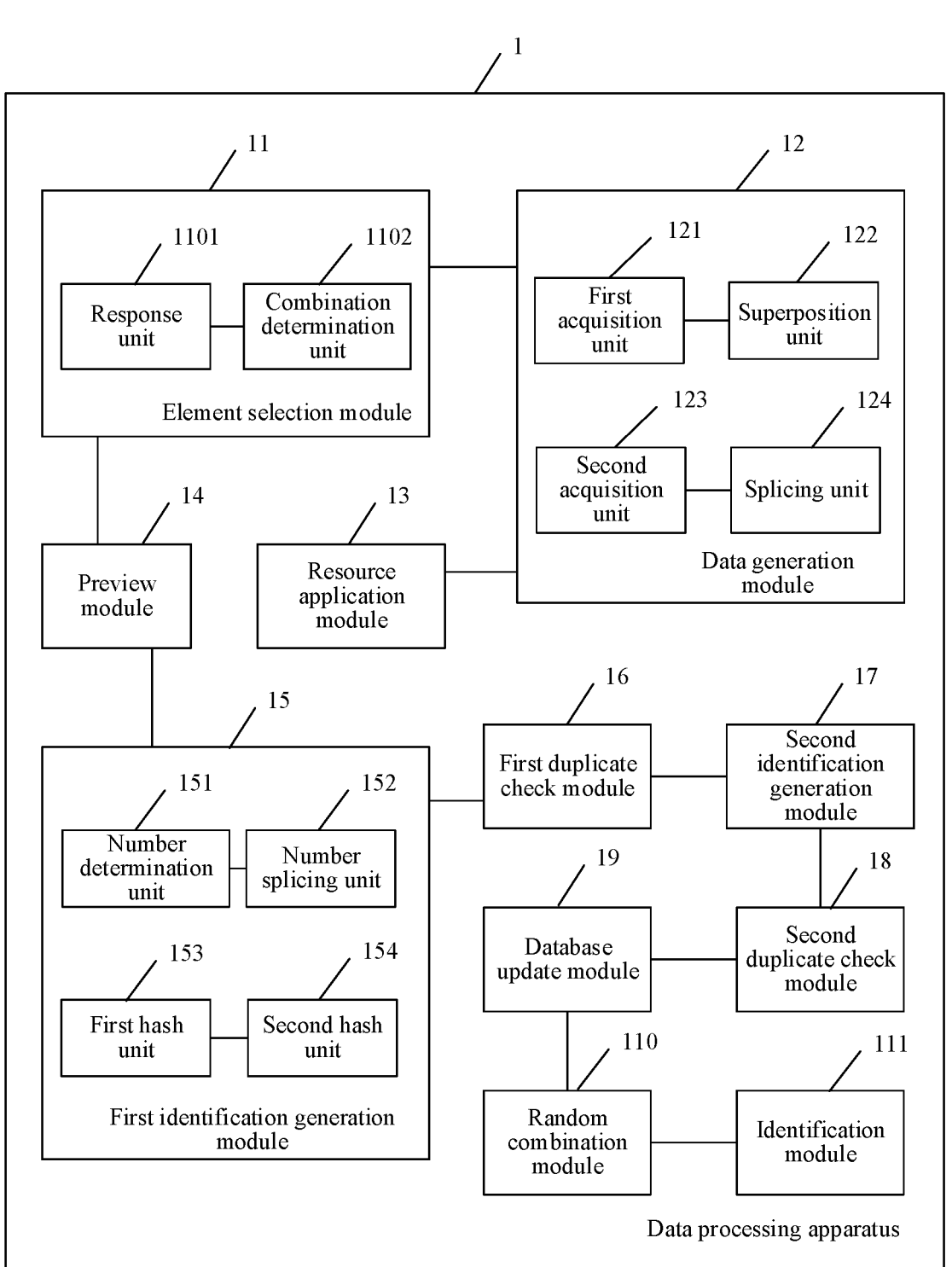
FIG. 10 is a schematic structural diagram of a blockchain-based data processing apparatus provided in an embodiment of this application.

Reference may be made to FIG. 10. FIG. 10 is a schematic structural diagram of a blockchain-based data processing apparatus provided in an embodiment of this application. The data processing apparatus may be a computer program (including a program code) running on a computer device. For example, the data processing apparatus is application software. The apparatus may be configured to perform the respective steps in the data processing method provided in the embodiments of this application. As shown in FIG. 10, the data processing apparatus 1 may include: an element selection module 11, a data generation module 12, and a resource application module 13.

The element selection module 11 is configured to acquire a target media element combination composed of selected media elements in response to a selection operation of a target object for the media elements, element types of the media elements in the target media element combination being different from each other.

The data generation module 12 is configured to generate target combined media data corresponding to the target media element combination in response to a virtual resource creation operation for the target media element combination.

The resource application module 13 is configured to transmit a virtual resource creation request for the target combined media data to a blockchain network, the virtual resource creation request being used for creating a target on-chain virtual resource corresponding to the target combined media data in response to determining, by the blockchain network, that the target combined media data passes duplicate check and verification, and an ownership right of the target on-chain virtual resource belonging to the target object.

The media element selection list includes m media element sub-lists, where m is a positive integer. The element types of the media elements in the same media element sub-list are same.

Referring to FIG. 10, the element selection module 11 includes: a response unit 1101 and a combination determination unit 1102.

The response unit 1101 is configured to respond to the selection operation of the target object for the media elements in the media element sets with different element types.

The combination determination unit 1102 is configured to acquire the selected media element in each media element set and determine the selected media elements in different types of media element sets as the target media element combination.

The above data processing apparatus 1 further includes a preview module 14.

The preview module 14 is configured to display combined preview media data corresponding to the target media element combination, the combined preview media data being obtained by fusing the media elements in the target media element combination.

The target media element combination includes m media elements, the m being a positive integer.

Referring to FIG. 10, the data generation module 12 includes: a first acquisition unit 121 and a superposition unit 122.

The first acquisition unit 121 is configured to acquire element media layers separately corresponding to the m media elements in response to the virtual resource creation operation for the target media element combination.

The superposition unit 122 is configured to recall an image service and perform layer superposition on m element media layers to obtain the target combined media data based on an element combination order configured in the image service.

The target media element combination includes m media elements, the m being a positive integer.

Referring to FIG. 10, the data generation module 12 includes: a second acquisition unit 123 and a splicing unit 124.

The second acquisition unit 123 is configured to acquire element media data segments separately corresponding to the m media elements in response to the virtual resource creation operation for the target media element combination.

The splicing unit 124 is configured to recall a segment splicing service and perform segment splicing on m element media data segments to obtain the target combined media data based on an element combination order configured in the segment splicing service.

Referring to FIG. 10, the above data processing apparatus 1 further includes: a first identification generation module 15 and a first duplicate check module 16.

The first identification generation module 15 is configured to generate a target combination identification corresponding to the target media element combination in response to a duplicate check operation for the target media element combination.

The first duplicate check module 16 is configured to display information prompting that the combination is occupied when a combination identification same as the target combination identification is found in an identification database.

The first duplicate check module 16 is further configured to display information prompting that the combination is unoccupied when the combination identification same as the target combination identification is not found in the identification database.

Referring to FIG. 10, the first identification generation module 15 includes: a number determination unit 151 and a number splicing unit 152.

The number determination unit 151 is configured to separately determine element numbers of respective media elements in the target media element combination in element types to which the media elements belong in response to the duplicate check operation for the target media element combination, media elements belonging to the same element type having different element numbers from each other.

The number splicing unit 152 is configured to splice the element numbers of the respective media elements in the element types to which the media elements belong to obtain the target combination identification based on an element combination order, the element combination order referring to a combination order between the respective media elements in the target media element combination in generating the target combined media data.

Referring to FIG. 10, the first identification generation module 15 includes: a first hash unit 153 and a second hash unit 154.

The first hash unit 153 is configured to separately perform first hash processing on respective media elements in the target media element combination to obtain element hash values of the respective media elements.

The second hash unit 154 is configured to perform second hash processing on the element hash values of the respective media elements to obtain the target combination identification based on an element combination order, the element combination order referring to a combination order between the respective media elements in the target media element combination in generating the target combined media data.

Referring to FIG. 10, the above data processing apparatus 1 further includes: a second identification generation module 17 and a second duplicate check module 18.

The second identification generation module 17 is configured to generate a target combination identification corresponding to the target media element combination based on the virtual resource creation operation.

The second duplicate check module 18 is configured to perform the operation of the generating target combined media data composed of the media elements in the target media element combination when a combination identification same as the target combination identification is not found in an identification database.

Referring to FIG. 10, the above data processing apparatus 1 further includes: a database update module 19.

The database update module 19 is configured to display information of successful resource creation and add the target combination identification into the identification database when the target on-chain virtual resource is created successfully.

The database update module 19 is further configured to display information prompting that the combination is occupied when the target combined media data fails to pass duplicate check and verification of the blockchain network.

Referring to FIG. 10, the above data processing apparatus 1 further includes: a random combination module 110.

The random combination module 110 is configured to acquire a random media element combination composed of randomly selected media elements in response to a random combination operation of the target object for the media elements, a random combination identification corresponding to the random media element combination being different from a combination identification in an identification database.

The random combination module 110 is further configured to generate random combined media data corresponding to the random media element combination in response to a virtual resource creation operation for the random media element combination.

The random combination module 110 is further configured to transmit a virtual resource creation request for the random combined media data to the blockchain network, the virtual resource creation request for the random combined media data being used for generating a random on-chain virtual resource corresponding to the target random combined media data in response to determining, by the blockchain network, that the random combined media data passes the duplicate check and verification, and the only ownership right of the random on-chain virtual resource belonging to the target object.

Referring to FIG. 10, the above data processing apparatus 1 further includes: an identification module 111.

The identification module 111 is configured to perform data identification on the target combined media data bound with the target on-chain virtual resource to obtain the target media element combination corresponding to the target combined media data.

The identification module 111 is further configured to generate a target combination identification corresponding to the target media element combination based on an element combination order, the target combination identification being used for characterizing the target object in the blockchain network, and the element combination order referring to a combination order between the respective media elements in the target media element combination in generating the target combined media data.

By the blockchain-based data processing apparatus provided in the embodiments of this application, the target object may first create the target combined media data which he likes by the media element selection list without only selecting the media data from the media data bound with the on-chain virtual resource as his own off-chain digital product. Then the terminal device may transmit the virtual resource creation request for the target combined media data to the blockchain network. When it is determined that the target combined media data passes the duplicate check and verification, the blockchain network may generate the target on-chain virtual resource corresponding to the target combined media data. By the combination of the media elements, the presentation style of the finally obtained target combined media data increases. Once the target combined media data is generated, it will be bound with the target object. In addition, there will be no situation where no man acquires it, which can reduce the waste of the on-chain virtual resource.

Figure 11:
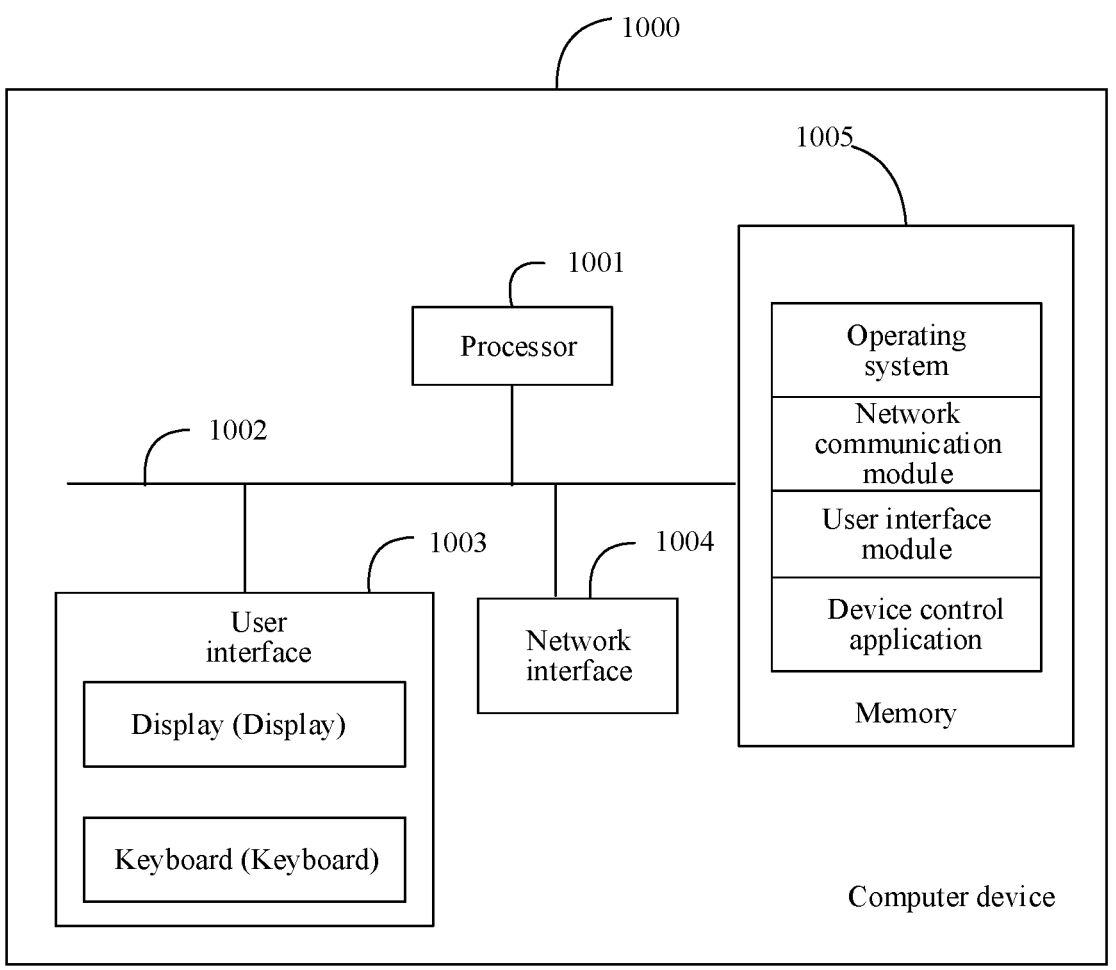
FIG. 11 is a schematic structural diagram of a computer device provided in an embodiment of this application.

Reference may be made to FIG. 11. FIG. 11 is a schematic structural diagram of a computer device provided in an embodiment of this application. As shown in FIG. 11, the data processing apparatus 1 in the embodiment corresponding to FIG. 10 may be applied to the computer device 1000. The computer device 1000 may include: a processor 1001, a network interface 1004, and a memory 1005. In addition, the above computer device 1000 may further include: a user interface 1003 and at least one communication bus 1002. The communication bus 1002 is configured to enable connection and communication of these components. The user interface 1003 may include a display and a keyboard. The alternative user interface 1003 may also include standard wired and wireless interfaces. The network interface 1004 may include standard wired and wireless interfaces (e.g., a WI-FI interface). The memory 1005 may be either a high-speed RAM or a non-volatile memory, such as at least one disk memory. The memory 1005 may also be at least one storage apparatus away from the above processor 1001. As shown in FIG. 11, as a non-transitory computer-readable storage medium, the memory 1005 may include an operating system, a network communication module, a user interface module, and a device control application.

In the computer device 1000 as shown in FIG. 11, the network interface 1004 may provide a network communication network element. The user interface 1003 is mainly configured to provide an interface for a user to input. The processor 1001 may be configured to recall the device control application stored in the memory 1005 to realize the above blockchain-based data processing method provided in the embodiments of this application.

It is understood that the computer device 1000 as described in the embodiments of this application may carry out the description of the data processing method as described in any one of the embodiments corresponding to FIG. 3 and FIG. 5, which will not be described in detail herein. In addition, the advantageous effects using the same method will not be described in detail.

Furthermore, the embodiments of this application also provide a non-transitory computer-readable storage medium, storing a computer program executed by the above data processing apparatus 1 therein. The computer program includes program instructions, when executed by a processor, being capable of performing the description of the data processing method in any one of the embodiments corresponding to FIG. 3 and FIG. 5, which will not be described in detail herein. In addition, the advantageous effects using the same method will not be described in detail. For technical details not disclosed in the embodiments of the computer-readable storage medium in this application, reference may be made to the description of the method embodiments of this application.

By adopting the apparatus provided in the embodiments of this application, the blockchain network may create the on-chain virtual resource for the target combined media data created by the target object. The on-chain virtual resource will be bound with the target object, and there will be no situation where the on-chain virtual resource is created in advance, but no man acquires it, which can avoid the waste of the on-chain virtual resource.

Figures 12, 13:
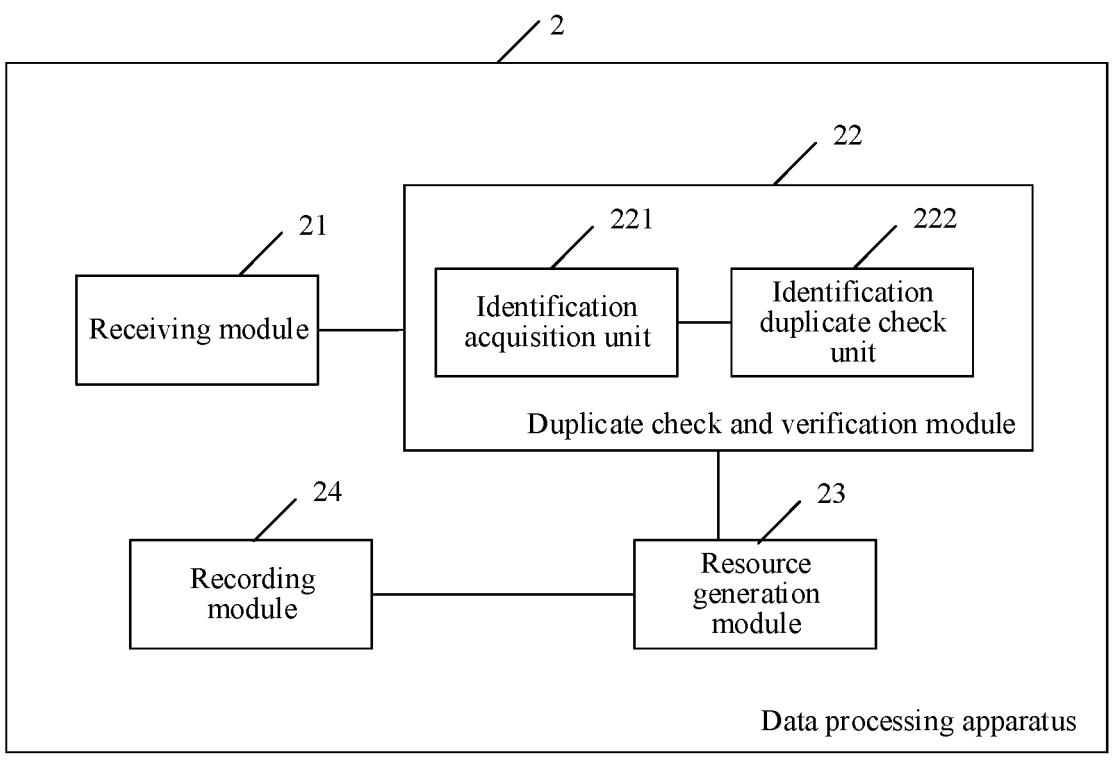
FIG. 12 is a schematic structural diagram of another blockchain-based data processing apparatus provided in an embodiment of this application.
FIG. 13 is a schematic structural diagram of another computer device provided in an embodiment of this application.

In some embodiments, reference may be made to FIG. 12. FIG. 12 is a schematic structural diagram of another blockchain-based data processing apparatus provided in an embodiment of this application. The data processing apparatus may be a computer program (including a program code) running on a computer device. For example, the data processing apparatus is application software. The apparatus may be configured to perform the respective steps in the method provided in the embodiments of this application. As shown in FIG. 12, the data processing apparatus 2 may include: a receiving module 21, a duplicate check and verification module 22 and a resource generation module 23.

The receiving module 21 is configured to receive a virtual resource creation request for target combined media data transmitted by a service node, the target combined media data being generated based on a target media element combination, the target media element combination including selected media elements based on a selection operation of a target object for the media elements, and element types of the media elements in the target media element combination being different from each other.

The duplicate check and verification module 22 is configured to perform duplicate check and verification on the target combined media data to obtain a duplicate check and verification result.

The resource generation module 23 is configured to create a target on-chain virtual resource corresponding to the target combined media data when the duplicate check and verification result indicates that the target combined media data passes the duplicate check and verification, an ownership right of the target on-chain virtual resource belonging to the target object.

Referring to FIG. 12, the duplicate check and verification module 22 includes: an identification acquisition unit 221 and an identification duplicate check unit 222.

The identification acquisition unit 221 is configured to acquire published combination identifications having a binding relationship with a published on-chain virtual resource from a blockchain ledger, the published combination identifications being generated based on a media element combination of combined media data associated with the published on-chain virtual resource.

The identification duplicate check unit 222 is configured to determine that the duplicate check and verification result indicates that the target combined media data fails to pass the duplicate check and verification when a combination identification same as the target combination identification is found in the published combination identifications.

The identification duplicate check unit 222 is further configured to determine that the duplicate check and verification result indicates that the target combined media data passes the duplicate check and verification when the combination identification same as the target combination identification is not found in the published combination identifications.

Referring to FIG. 12, the above data processing apparatus 2 further includes: a recording module 24.

The recording module 24 is configured to write a binding relationship between the target on-chain virtual resource, the target combination identification, and the target object into the blockchain ledger, the target combination identification being generated based on the media elements in the target media element combination.

In some embodiments, reference may be made to FIG. 13. FIG. 13 is a schematic structural diagram of another computer device provided in an embodiment of this application. As shown in FIG. 13, the data processing apparatus 2 in the embodiment corresponding to FIG. 13 may be applied to the computer device 2000. The computer device 2000 may include: a processor 2001, a network interface 2004, and a memory 2005. In addition, the above computer device 2000 further includes: a user interface 2003 and at least one communication bus 2002. The communication bus 2002 is configured to enable connection and communication of these components. The user interface 2003 may include a display and a keyboard. The alternative user interface 2003 may also include standard wired and wireless interfaces. The network interface 2004 may include standard wired and wireless interfaces (e.g., a WI-FI interface). The memory 2005 may be either a high-speed RAM or a non-volatile memory, such as at least one disk memory. The memory 2005 may also be at least one storage apparatus away from the above processor 2001. As shown in FIG. 13, as a non-transitory computer-readable storage medium, the memory 2005 may include an operating system, a network communication module, a user interface module, and a device control application.

In the computer device 2000 as shown in FIG. 13, the network interface 2004 may provide a network communication function. The user interface 2003 is mainly configured to provide an interface for a user to input. The processor 2001 may be configured to recall the device control application stored in the memory 2005 to realize:

receiving a virtual resource creation request for target combined media data, the target combined media data being generated based on a target media element combination, the target media element combination including selected media elements based on a selection operation of a target object for the media elements, and element types of the media elements in the target media element combination being different from each other;

performing duplicate check and verification on the target combined media data to obtain a duplicate check and verification result; and generating a target on-chain virtual resource corresponding to the target combined media data when the duplicate check and verification result indicates that the target combined media data passes the duplicate check and verification, an ownership right of the target on-chain virtual resource belonging to the target object.

It is understood that the computer device 2000 as described in the embodiments of this application may carry out the description of the access control method as described in the embodiments, and may also carry out the description of the data processing apparatus 2 as described in the embodiment corresponding to FIG. 11, which will not be described in detail herein. In addition, the advantageous effects using the same method will not be described in detail.

Furthermore, the embodiments of this application also provide a non-transitory computer-readable storage medium, storing a computer program executed by the above data processing apparatus 2 therein. The computer program, when loaded and executed by a processor, being capable of performing the description of the access control method in any one of the embodiments, which will not be described in detail herein. In addition, the advantageous effects using the same method will not be described in detail. For technical details not disclosed in the embodiments of the computer-readable storage medium in this application, reference may be made to the description of the method embodiments of this application.

The computer-readable storage medium may be a data processing apparatus provided in any one of the embodiments described above or an internal storage unit of the computer device as described above, such as a hard disk or a memory of the computer device. The computer-readable storage medium may also be an external storage device of the computer device, such as a plug-in hard disk, a smart media card (SMC), a secure digital (SD) card, and a flash card provided on the computer device. In some embodiments, the computer-readable storage medium may also include both the internal storage unit and the external storage device of the computer device. The computer-readable storage medium is configured to store the computer program and other programs and data needed by the computer device. The computer-readable storage medium may also be configured to temporarily store the outputted data or the data to be outputted.

An embodiment of this application further provides a computer program product and a computer program, and the computer program product or the computer program includes a computer instruction stored in a non-transitory computer-readable storage medium. The processor of the computer device reads the computer instruction from the computer-readable storage medium, and the processor executes the computer instruction to cause the computer device to perform the method provided in any one of the above embodiments of this application.

In the specification, claims, and the drawings of the embodiments of this application, the terms "first", "second", and the like are intended to distinguish different objects and not to describe a specific order. Furthermore, the terms "include" and any variations thereof are intended to cover a non-exclusive inclusion. For example, the processes, methods, apparatuses, products, or devices that include a series of steps or units are not limited to the listed steps or modules, but optionally include unlisted steps or modules or other steps and units inherent to these processes, methods, apparatuses, products, or devices.

Those skilled in the art will recognize that the units and algorithm steps of various examples described in connection with the embodiments disclosed in this application may be implemented in electronic hardware, computer software, or a combination of the two. To clearly illustrate the interchangeability of hardware and software, the composition and steps of each example are described generally based on the network elements in the above description. Whether these network elements are performed in hardware or software depends upon the particular application and design constraint imposed on the technical solution. Skilled artisans may implement the described network elements in various ways for each particular application, but such implementation is not be interpreted as departing from the scope of this application.

The above disclosure is merely an exemplary embodiment of this application. It is not intended to limit the scope of the claims of this application, and therefore equivalent variations according to the claims of this application are within the scope of this application.

What is claimed is:

1. A blockchain-based data processing method performed by a computer device, the method comprising:

in response to a selection operation of media elements associated with a target object, acquiring a target media element combination based on the selected media elements, wherein:

the target media element combination comprises m media elements, the m being a positive integer;

each of the m media elements corresponds to a unique one of predetermined m element types; and each of the m media elements is associated with a presentation style determined from a plurality of predetermined presentation styles associated with the respective unique one of predetermined m element types;

in response to a virtual resource creation operation for the target media element combination, generating target combined media data corresponding to the target media element combination; and transmitting a virtual resource creation request for the target combined media data to a blockchain network, wherein the blockchain network creates a target on-chain virtual resource corresponding to the target combined media data after determining that the target combined media data passes duplicate check and verification, and an ownership right of the target on-chain virtual resource belonging to the target object.

2. The method according to claim 1, wherein the acquiring a target media element combination based on the selected media elements comprises:

determining the selected media elements in different types of media element sets as the target media element combination in response to the selection operation of the target object for the media elements in the media element sets with different element types, and the method further comprises:

displaying combined preview media data corresponding to the target media element combination, the combined preview media data being obtained by fusing the media elements in the target media element combination.

3. The method according to claim 1, wherein the generating target combined media data corresponding to the target media element combination comprises:

acquiring element media layers separately corresponding to the m media elements in response to the virtual resource creation operation for the target media element combination; and performing layer superposition on m element media layers to obtain the target combined media data based on a pre-configured element combination order.

4. The method according to claim 1, wherein the generating target combined media data corresponding to the target media element combination comprises:

acquiring element media data segments separately corresponding to the m media elements in response to the virtual resource creation operation for the target media element combination; and performing segment splicing on m element media data segments to obtain the target combined media data based on a pre-configured element combination order.

5. The method according to claim 1, further comprising:

generating a target combination identification corresponding to the target media element combination in response to a duplicate check operation for the target media element combination;

displaying information prompting that the combination is occupied when a combination identification same as the target combination identification is found in an identification database; and displaying information prompting that the combination is unoccupied when the combination identification same as the target combination identification is not found in the identification database.

6. The method according to claim 1, further comprising:

generating a target combination identification corresponding to the target media element combination based on the virtual resource creation operation; and performing the operation of the generating target combined media data corresponding to the target media element combination when a combination identification same as the target combination identification is not found in an identification database.

7. The method according to claim 1, further comprising:

performing data identification on the target combined media data bound with the target on-chain virtual resource to obtain the target media element combination corresponding to the target combined media data; and generating a target combination identification corresponding to the target media element combination based on an element combination order, the target combination identification being used for characterizing the target object in the blockchain network, and the element combination order referring to a combination order between the respective media elements in the target media element combination in generating the target combined media data.

8. A computer device, comprising a processor, a memory, and a network interface, the processor being separately connected to the memory and the network interface, the network interface being configured to provide a data communication function, the memory being configured to store a program code that, when executed by the processor, causes the computer device to perform a blockchain-based data processing method including:

in response to a selection operation of media elements associated with a target object, acquiring a target media element combination based on the selected media elements, wherein:

the target media element combination comprises m media elements, the m being a positive integer;

each of the m media elements corresponds to a unique one of predetermined m element types; and each of the m media elements is associated with a presentation style determined from a plurality of predetermined presentation styles associated with the respective unique one of predetermined m element types;

in response to a virtual resource creation operation for the target media element combination, generating target combined media data corresponding to the target media element combination; and transmitting a virtual resource creation request for the target combined media data to a blockchain network, wherein the blockchain network creates a target on-chain virtual resource corresponding to the target combined media data after determining that the target combined media data passes duplicate check and verification, and an ownership right of the target on-chain virtual resource belonging to the target object.

9. The computer device according to claim 8, wherein the acquiring a target media element combination based on the selected media elements comprises:

determining the selected media elements in different types of media element sets as the target media element combination in response to the selection operation of the target object for the media elements in the media element sets with different element types, and the method further comprises:

displaying combined preview media data corresponding to the target media element combination, the combined preview media data being obtained by fusing the media elements in the target media element combination.

10. The computer device according to claim 8, wherein the generating target combined media data corresponding to the target media element combination comprises:

acquiring element media layers separately corresponding to the m media elements in response to the virtual resource creation operation for the target media element combination; and performing layer superposition on m element media layers to obtain the target combined media data based on a pre-configured element combination order.

11. The computer device according to claim 8, wherein the generating target combined media data corresponding to the target media element combination comprises:

acquiring element media data segments separately corresponding to the m media elements in response to the virtual resource creation operation for the target media element combination; and performing segment splicing on m element media data segments to obtain the target combined media data based on a pre-configured element combination order.

12. The computer device according to claim 8, wherein the method further comprises:

generating a target combination identification corresponding to the target media element combination in response to a duplicate check operation for the target media element combination;

displaying information prompting that the combination is occupied when a combination identification same as the target combination identification is found in an identification database; and displaying information prompting that the combination is unoccupied when the combination identification same as the target combination identification is not found in the identification database.

13. The computer device according to claim 8, wherein the method further comprises:

generating a target combination identification corresponding to the target media element combination based on the virtual resource creation operation; and performing the operation of the generating target combined media data corresponding to the target media element combination when a combination identification same as the target combination identification is not found in an identification database.

14. The computer device according to claim 8, wherein the method further comprises:

performing data identification on the target combined media data bound with the target on-chain virtual resource to obtain the target media element combination corresponding to the target combined media data; and generating a target combination identification corresponding to the target media element combination based on an element combination order, the target combination identification being used for characterizing the target object in the blockchain network, and the element combination order referring to a combination order between the respective media elements in the target media element combination in generating the target combined media data.

15. A non-transitory computer-readable storage medium, storing a computer program therein, the computer program being loaded and executed by a processor of a computer device and causing the computer device to perform a blockchain-based data processing method including:

in response to a selection operation of media elements associated with a target object, acquiring a target media element combination based on the selected media elements, wherein:

the target media element combination comprises m media elements, the m being a positive integer;

each of the m media elements corresponds to a unique one of predetermined m element types; and each of the m media elements is associated with a presentation style determined from a plurality of predetermined presentation styles associated with the respective unique one of predetermined m element types;

in response to a virtual resource creation operation for the target media element combination, generating target combined media data corresponding to the target media element combination; and transmitting a virtual resource creation request for the target combined media data to a blockchain network, wherein the blockchain network creates a target on-chain virtual resource corresponding to the target combined media data after determining that the target combined media data passes duplicate check and verification, and an ownership right of the target on-chain virtual resource belonging to the target object.

16. The non-transitory computer-readable storage medium according to claim 15, wherein the generating target combined media data corresponding to the target media element combination comprises:

acquiring element media layers separately corresponding to the m media elements in response to the virtual resource creation operation for the target media element combination; and performing layer superposition on m element media layers to obtain the target combined media data based on a pre-configured element combination order.

17. The non-transitory computer-readable storage medium according to claim 15, wherein the generating target combined media data corresponding to the target media element combination comprises:

acquiring element media data segments separately corresponding to the m media elements in response to the virtual resource creation operation for the target media element combination; and performing segment splicing on m element media data segments to obtain the target combined media data based on a pre-configured element combination order.

18. The non-transitory computer-readable storage medium according to claim 15, wherein the method further comprises:

generating a target combination identification corresponding to the target media element combination in response to a duplicate check operation for the target media element combination;

displaying information prompting that the combination is occupied when a combination identification same as the target combination identification is found in an identification database; and displaying information prompting that the combination is unoccupied when the combination identification same as the target combination identification is not found in the identification database.

19. The non-transitory computer-readable storage medium according to claim 15, wherein the method further comprises:

generating a target combination identification corresponding to the target media element combination based on the virtual resource creation operation; and performing the operation of the generating target combined media data corresponding to the target media element combination when a combination identification same as the target combination identification is not found in an identification database.

20. The non-transitory computer-readable storage medium according to claim 15, wherein the method further comprises:

performing data identification on the target combined media data bound with the target on-chain virtual resource to obtain the target media element combination corresponding to the target combined media data; and generating a target combination identification corresponding to the target media element combination based on an element combination order, the target combination identification being used for characterizing the target object in the blockchain network, and the element combination order referring to a combination order between the respective media elements in the target media element combination in generating the target combined media data.

* * * * *